United States Patent
Akahori

(10) Patent No.: US 11,598,860 B2
(45) Date of Patent: Mar. 7, 2023

(54) DISTANCE IMAGE CAPTURING DEVICE, DISTANCE IMAGE CAPTURING SYSTEM, AND DISTANCE IMAGE CAPTURING METHOD

(71) Applicant: Brookman Technology, Inc., Hamamatsu (JP)

(72) Inventor: Tomoyuki Akahori, Hamamatsu (JP)

(73) Assignee: Brookman Technology, Inc., Shizuoka (JP)

( * ) Notice: Subject to any disclaimer, the term of this patent is extended or adjusted under 35 U.S.C. 154(b) by 151 days.

(21) Appl. No.: 16/619,448

(22) PCT Filed: Mar. 20, 2019

(86) PCT No.: PCT/JP2019/011662
§ 371 (c)(1),
(2) Date: Dec. 4, 2019

(87) PCT Pub. No.: WO2020/188782
PCT Pub. Date: Sep. 24, 2020

(65) Prior Publication Data
US 2021/0333372 A1    Oct. 28, 2021

(51) Int. Cl.
*G01S 7/48*  (2006.01)
*G01S 17/89*  (2020.01)
(Continued)

(52) U.S. Cl.
CPC .......... *G01S 7/4865* (2013.01); *G01S 7/4863* (2013.01); *G01S 17/894* (2020.01); *H04N 5/353* (2013.01)

(58) Field of Classification Search
CPC .... G01S 7/4865; G01S 17/894; G01S 7/4863; H04N 5/353
(Continued)

(56) References Cited

U.S. PATENT DOCUMENTS

2013/0228691 A1*  9/2013  Shah ................. G01S 17/10
250/341.8

FOREIGN PATENT DOCUMENTS

JP    2013235390 A    11/2013
JP    2017190978 A    10/2017
(Continued)

OTHER PUBLICATIONS

"International Application Serial No. PCT/JP2019/011662, International Search Report dated Jun. 25, 2019", (dated Jun. 25, 2019), 2 pgs.

*Primary Examiner* — Jeffery A Williams
(74) *Attorney, Agent, or Firm* — Schwegman Lundberg & Woessner, P.A.

(57) ABSTRACT

A light source unit, a light receiving unit that includes a distance image sensor in which a plurality of pixels each including a photoelectric conversion device generating electric charge corresponding to incident light and a plurality of electric charge accumulating units accumulating the electric charge and dividing and accumulating the electric charge among the electric charge accumulating units at a predetermined accumulation timing are arranged in a two-dimensional matrix pattern, a distance image processing unit that is configured to acquire a distance from a subject present in the space that is an imaging target, and a timing determining unit that is configured to determine the accumulation timing in the measurement time interval on the basis of an electric charge amount in each of the electric charge accumulating units in an inspection time interval in which the light pulse is not emitted at the accumulation timing are provided.

8 Claims, 17 Drawing Sheets

(51) Int. Cl.
  *G01S 7/4865* (2020.01)
  *G01S 17/894* (2020.01)
  *G01S 7/4863* (2020.01)
  *H04N 5/353* (2011.01)

(58) Field of Classification Search
  USPC .......................................................... 348/135
  See application file for complete search history.

(56) References Cited

FOREIGN PATENT DOCUMENTS

| | | | |
|---|---|---|---|
| JP | 2017191042 A | 10/2017 | |
| WO | WO-2017013857 A1 | 1/2017 | |

* cited by examiner

FIG. 7

| LENGTH OF ND TIME INTERVAL Tc IN INSPECTION TIME INTERVAL | ELECTRIC CHARGE ACCUMULATING UNIT CS IN WHICH AMOUNT OF ACCUMULATED ELECTRIC CHARGE IS MAXIMUM | | |
|---|---|---|---|
| | CS1 | CS2 | CS3 |
| 0D | 1D | 2D | 3D |
| 1D | 2D | 3D | 4D |
| 2D | 3D | 4D | 5D |
| 3D | 0D | 1D | 2D |
| 4D | 1D | 2D | 3D |
| 5D | 2D | 3D | 4D |
| 6D | 3D | 4D | 5D |

~44

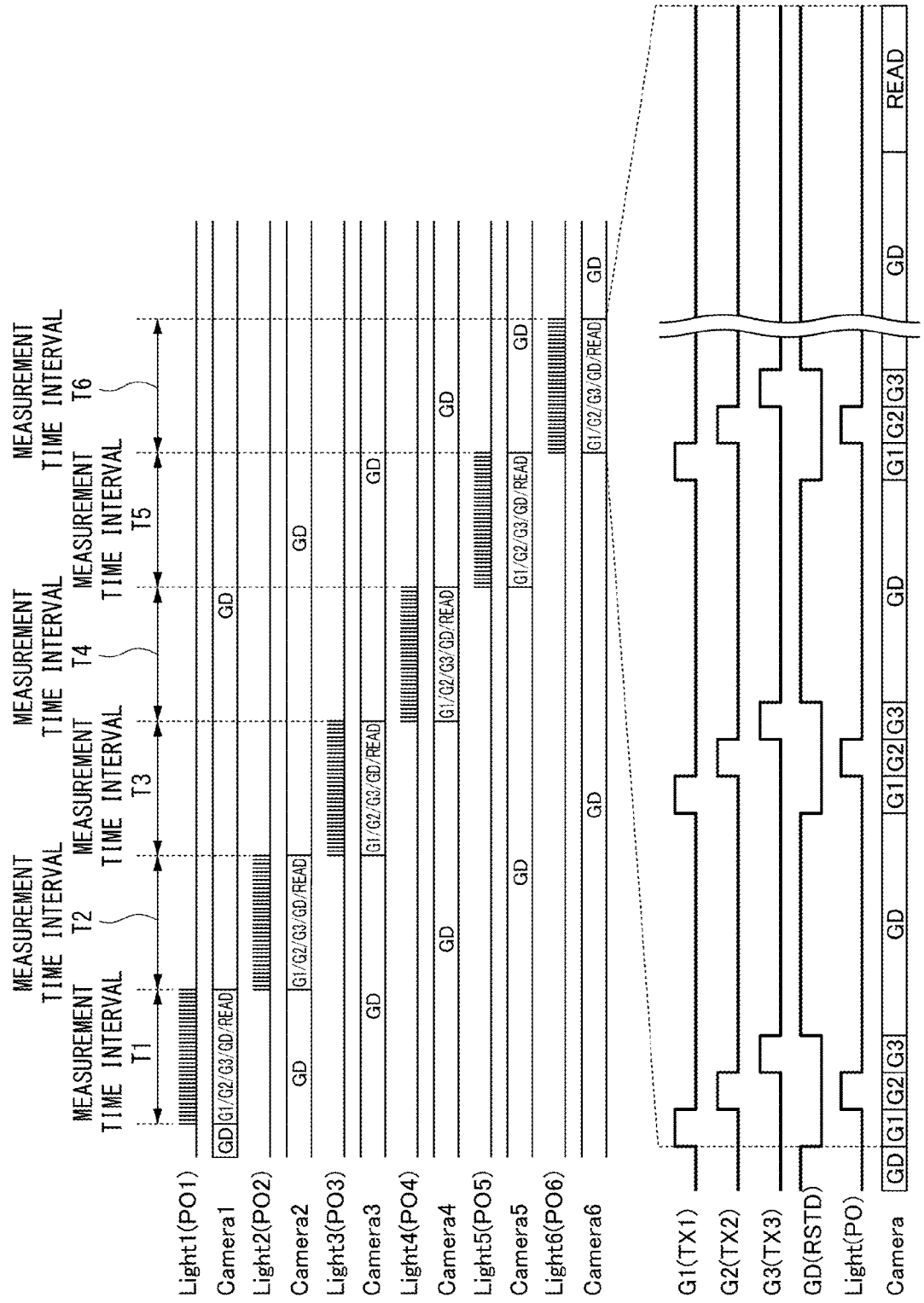

DISTANCE IMAGE CAPTURING DEVICE, DISTANCE IMAGE CAPTURING SYSTEM, AND DISTANCE IMAGE CAPTURING METHOD

This application is a U.S. National Stage Filing under 35 U.S.C. 371 from International Application No. PCT/JP2019/011662, filed on Mar. 20, 2019, and published as WO2020/188782 on Sep. 24, 2020; the benefit of priority of which is hereby claimed herein, and which application and publication are hereby incorporated herein by reference in their entireties.

TECHNICAL FIELD

The present invention relates to a distance image capturing device, a distance image capturing system, and a distance image capturing method.

BACKGROUND ART

Conventionally, distance sensors of a time of flight (hereinafter referred to as "TOF") system measuring a distance from a subject that is a target object on the basis of a flight time of light using the fact that the speed of light is known have been realized. In a distance sensor of the TOF system, near-infrared light is emitted to a space of an imaging target, and a distance from a subject is measured on the basis of a difference between a time at which the near-infrared light is emitted and a time at which the near-infrared light is reflected by a subject and returns, in other words, a flight time of the near-infrared light.

In addition, among the recent TOF system based distance sensor, similar to a solid-state imaging device mounted in an image capturing device, a so-called distance image capturing device, in which a plurality of pixels detecting light used for measuring a distance are disposed in a two-dimensional matrix pattern, capable of acquiring (capturing) not only information of a two-dimensional distance from a subject but also an image of the subject has also been realized.

In a distance image capturing device, there is a system employing a configuration in which near-infrared light having a pulse shape (hereinafter referred to as a "light pulse") is emitted, and a flight time of the light pulse is measured on the basis of a difference between a time at which the light pulse is emitted and a time at which the light pulse reflected by a subject is detected after a predetermined time among a plurality of systems for measuring a distance from a subject. In a distance image capturing device of such a system, there is an imaging device used as a sensor for acquiring information of a distance from a subject and an image of the subject having a configuration in which a plurality of electric charge accumulating parts and a constituent element dividing electric charge among the electric charge accumulating parts are disposed within each pixel. In an imaging device having such a divisional configuration, a distance from a subject can be measured by dividing electric charge generated by a photoelectric conversion device configuring a pixel among electric charge accumulating parts and calculating a delay time of a light pulse that arrives after being reflected by the subject on the basis of a ratio of electric charge divided among the electric charge accumulating units.

It is necessary for a distance image capturing device to measure a distance in various situations and environments of a subject. For example, there is a situation in which a plurality of distance image capturing devices are adjacently present, or there is an environment in which a subject that is a target for which a distance is measured by being surrounded by a plurality of distance image capturing devices. In such a situation or environment, direct light or reflective light of a light pulse emitted by another distance image capturing device may be mixed in the reflective light of a light pulse emitted by a certain distance image capturing device. In such a case, a situation in which a light pulse emitted by another distance image capturing device is erroneously recognized as a light pulse reflected by a subject, and accuracy of measurement of a distance from a subject will decrease or a distance from a subject cannot be measured is conceivable. For this reason, in an environment in which a light pulse emitted from another distance image capturing device is incident, in order for a distance image capturing device to measure a distance from a subject, it is preferable to reduce the influence of the light pulse emitted from the other distance image capturing device.

In relation to this, for example, as disclosed in Patent Document 1, a technology relating to a distance sensor (distance image capturing device) has been proposed. The distance sensor disclosed in Patent Document 1 includes a period setting unit that is configured to change the length of an accumulation period such that a total time interval of accumulation periods corresponding to a predetermined number of times deviates by one accumulation period or more before and after the change in the length of the accumulation period. Here, the accumulation period is a period in which a light receiving unit accumulates the amount of received light in accordance with the emission of light using a light source unit. In other words, in the technology of the distance sensor disclosed in Patent Document 1, the length of the accumulation period is changed. In this way, in the distance sensor disclosed in Patent Document 1, in a time interval of the accumulation period, while incidence of interference light (a light pulse emitted from another distance sensor) is allowed, the influence of interference light included in electric charge divided among the electric charge accumulating units is statistically uniformized, whereby erroneous measurement of a distance according to the incidence of interference light can be inhibited.

CITATION LIST

Patent Literature

[Patent Document 1]
Japanese Unexamined Patent Application, First Publication No. 2017-190978

SUMMARY OF INVENTION

Technical Problem

However, it is difficult to say that the technology of the distance sensor disclosed in Patent Document 1 is easy to use. For example, in the sensor disclosed in Patent Document 1, a total time interval of accumulation periods corresponding to a predetermined number of times is configured to deviate by one accumulation period or more before and after a change in the length of the accumulation period. In other words, a time required for the measurement of a distance is different before and after a change in the length of the accumulation period. In this case, whenever a measurement is performed by the sensor, a time required for the measurement changes, and it is difficult to use the sensor in a case in which each measurement result is to be integrated.

In addition, in the sensor disclosed in Patent Document 1, it is determined whether or not interference has occurred on the basis of the magnitude of the rate of change in measured distance. For this reason, the presence/absence of interference cannot be determined before a distance is measured. In other words, in the sensor disclosed in Patent Document 1, particularly in a case in which a distance from a subject is measured using a plurality of sensors or the like, there is a concern that the sensor is difficult to use.

The present invention is in view of the problems described above, and an object thereof is to provide a distance image capturing device, a distance image capturing system, and a distance image capturing method capable of inhibiting erroneous measurement of a distance according to the incidence of interference light without degrading convenience.

Solution to Problem

According to a first aspect of the present invention, there is provided a distance image capturing device including: a light source unit that is configured to emit an intermittent light pulse into a space that is an imaging target at a predetermined period; a light receiving unit that includes a distance image sensor in which a plurality of pixels each including a photoelectric conversion device generating electric charge corresponding to incident light and a plurality of electric charge accumulating units accumulating the electric charge and dividing and accumulating the electric charge among the electric charge accumulating units at a predetermined accumulation timing are arranged in a two-dimensional matrix pattern; a distance image processing unit that is configured to acquire a distance from a subject present in the space that is an imaging target on the basis of an electric charge amount in each of the electric charge accumulating units in a measurement time interval in which the light pulse is emitted in synchronization with the accumulation timing; and a timing determining unit that is configured to determine the accumulation timing in the measurement time interval on the basis of an electric charge amount in each of the electric charge accumulating units in an inspection time interval in which the light pulse is not emitted at the accumulation timing.

According to a second aspect of the present invention, the timing determining unit is configured to determine the accumulation timing in the measurement time interval in accordance with the electric charge amount accumulated in each of the electric charge accumulating units in the inspection time interval and the accumulation timing in the inspection time interval.

According to a third aspect of the present invention, the timing determining unit is configured to determine the accumulation timing in the measurement time interval such that an accumulation time interval in which the electric charge is accumulated in the electric charge accumulating unit in which the electric charge amount accumulated in the inspection time interval is a maximum in the inspection time interval and the accumulation time interval of each of the electric charge accumulating units at the accumulation timing in the measurement time interval do not overlap each other in an accumulation period that is a period in which the accumulation time interval is repeated.

According to a fourth aspect of the present invention, the timing determining unit is configured to determine the accumulation timing in the measurement time interval on the basis of a timing information table in which identification information of the electric charge accumulating unit in which the electric charge amount accumulated in the inspection time interval is a maximum and information relating to the accumulation timing in the measurement time interval are associated with each other.

According to a fifth aspect of the present invention, a length of the inspection time interval is shorter than a length of the measurement time interval.

According to a sixth aspect of the present invention, there is provided a distance image capturing device including: a light source unit that is configured to emit a light pulse into a space that is an imaging target at a predetermined period; a light receiving unit that includes a distance image sensor in which a plurality of pixels each including a photoelectric conversion device generating electric charge corresponding to incident light and a plurality of electric charge accumulating units accumulating the electric charge and dividing and accumulating the electric charge among the electric charge accumulating units in synchronization of emission of the light pulse are arranged in a two-dimensional matrix pattern; a distance image processing unit that is configured to acquire a distance from a subject present in the space that is an imaging target on the basis of an electric charge amount in each of the electric charge accumulating units in a measurement time interval in which accumulation of the electric charge is executed a predetermined number of electric charge division instances; and an accumulation period changing unit that is configured to change a length of the accumulation period such that there is no change in the length of the measurement time interval before and after change of the length of the accumulation period that is a period in which the electric charge is accumulated in each of the electric charge accumulating units.

A distance image capturing system according to a seventh aspect of the present invention is a distance image capturing system including: a plurality of distance image capturing devices; and an external control device that is communicatively connected to the plurality of distance image capturing devices. Each of the plurality of distance image capturing devices includes: a light source unit that is configured to emit a light pulse into a space that is an imaging target at a predetermined period; a light receiving unit that includes a distance image sensor in which a plurality of pixels each including a photoelectric conversion device generating electric charge corresponding to incident light and a plurality of electric charge accumulating units accumulating the electric charge and dividing and accumulating the electric charge among the electric charge accumulating units in synchronization of emission of the light pulse are arranged in a two-dimensional matrix pattern; a distance image processing unit that is configured to acquire a distance from a subject present in the space that is an imaging target on the basis of an electric charge amount in each of the electric charge accumulating units in a measurement time interval in which accumulation of the electric charge is executed a predetermined number of electric charge division instances; and an information acquiring unit that is configured to acquire information from the external control device. The external control device includes a timing control unit that is configured to perform control such that an accumulation timing at which the electric charge accumulating unit accumulates the electric charge in a first distance image capturing device among the plurality of distance image capturing devices and the accumulation timing in a second distance image capturing device other than the first distance image capturing device do not overlap each other with respect to time.

According to an eighth aspect of the present invention, in the distance image capturing system according to the seventh aspect described above, the timing control unit is configured to control the accumulation timing such that the accumulation timing of the second distance image capturing device comes in a time interval other than the accumulation timing of the first distance image capturing device.

According to a ninth aspect of the present invention, in the distance image capturing system according to the seventh aspect described above, the timing control unit is configured to control the accumulation timing such that the measurement time interval of the second distance image capturing device starts after the measurement time interval of the first distance image capturing device ends.

According to a tenth aspect of the present invention, there is provided a distance image capturing method including: a process of emitting, by a light source unit, an intermittent light pulse into a space that is an imaging target at a predetermined period; a light receiving process of receiving light by a light receiving unit including a distance image sensor in which a plurality of pixels each including a photoelectric conversion device generating electric charge corresponding to incident light and a plurality of electric charge accumulating units accumulating the electric charge and dividing and accumulating the electric charge among the electric charge accumulating units at a predetermined accumulation timing are arranged in a two-dimensional matrix pattern; a distance image processing process of acquiring, by a distance image processing unit, a distance from a subject present in the space that is an imaging target on the basis of an electric charge amount in each of the electric charge accumulating units in a measurement time interval in which the light pulse is emitted in synchronization with the accumulation timing; and a timing determining process of determining, by a timing determining unit, the accumulation timing in the measurement time interval on the basis of an electric charge amount in each of the electric charge accumulating units in an inspection time interval in which the light pulse is not emitted at the accumulation timing.

According to an eleventh aspect of the present invention, there is provided a distance image capturing method including: a process of emitting, by a light source unit, a light pulse into a space that is an imaging target at a predetermined period; a light receiving process of receiving light by a light receiving unit including a distance image sensor in which a plurality of pixels each including a photoelectric conversion device generating electric charge corresponding to incident light and a plurality of electric charge accumulating units accumulating the electric charge and dividing and accumulating the electric charge among the electric charge accumulating units in synchronization of emission of the light pulse are arranged in a two-dimensional matrix pattern; a distance image processing process of acquiring, by a distance image processing unit, a distance from a subject present in the space that is an imaging target on the basis of an electric charge amount in each of the electric charge accumulating units in a measurement time interval in which accumulation of the electric charge is executed a predetermined number of electric charge division instances; and an accumulation period changing process of changing, by an accumulation period changing unit, a length of the accumulation period such that there is no change in the length of the measurement time interval before and after change of the length of the accumulation period that is a period in which the electric charge is accumulated in each of the electric charge accumulating units.

A distance image capturing method according to a twelfth aspect of the present invention is a distance image capturing method in a distance image capturing system including a plurality of distance image capturing devices and an external control device that is communicatively connected to the plurality of distance image capturing devices, the distance image capturing method including: a process of emitting, by a light source unit in each of the plurality of distance image capturing devices, a light pulse into a space that is an imaging target at a predetermined period; a light receiving process of receiving light by a light receiving unit in each of the plurality of distance image capturing devices including a distance image sensor in which a plurality of pixels each including a photoelectric conversion device generating electric charge corresponding to incident light and a plurality of electric charge accumulating units accumulating the electric charge and dividing and accumulating the electric charge among the electric charge accumulating units in synchronization of emission of the light pulse are arranged in a two-dimensional matrix pattern; a distance image processing process of acquiring, by a distance image processing unit in each of the plurality of distance image capturing devices, a distance from a subject present in the space that is an imaging target on the basis of an electric charge amount in each of the electric charge accumulating units in a measurement time interval in which accumulation of the electric charge is executed a predetermined number of electric charge division instances; an information acquiring process of acquiring, by an information acquiring unit in each of the plurality of distance image capturing devices, information from the external control device; and a timing control process of performing, by a timing control unit in the external control device, control such that an accumulation timing at which the electric charge accumulating unit accumulates the electric charge in a first distance image capturing device among the plurality of distance image capturing devices and the accumulation timing in a second distance image capturing device other than the first distance image capturing device do not overlap each other with respect to time.

Advantageous Effects of Invention

According to each of the aspects described above, erroneous measurement of a distance according to the incidence of interference light can be inhibited without degrading convenience.

BRIEF DESCRIPTION OF DRAWINGS

FIG. 7 is a diagram showing an example of the configuration of information stored in a timing information table 44 according to the first embodiment of the present invention.

FIG. 13 is a timing diagram showing timings at which a pixel 321 is driven in the distance image capturing device 1B according to the third embodiment of the present invention.

DESCRIPTION OF EMBODIMENTS

Hereinafter, embodiments of the present invention will be described with reference to the drawings.

First Embodiment

First, a first embodiment will be described.

Figure 1:
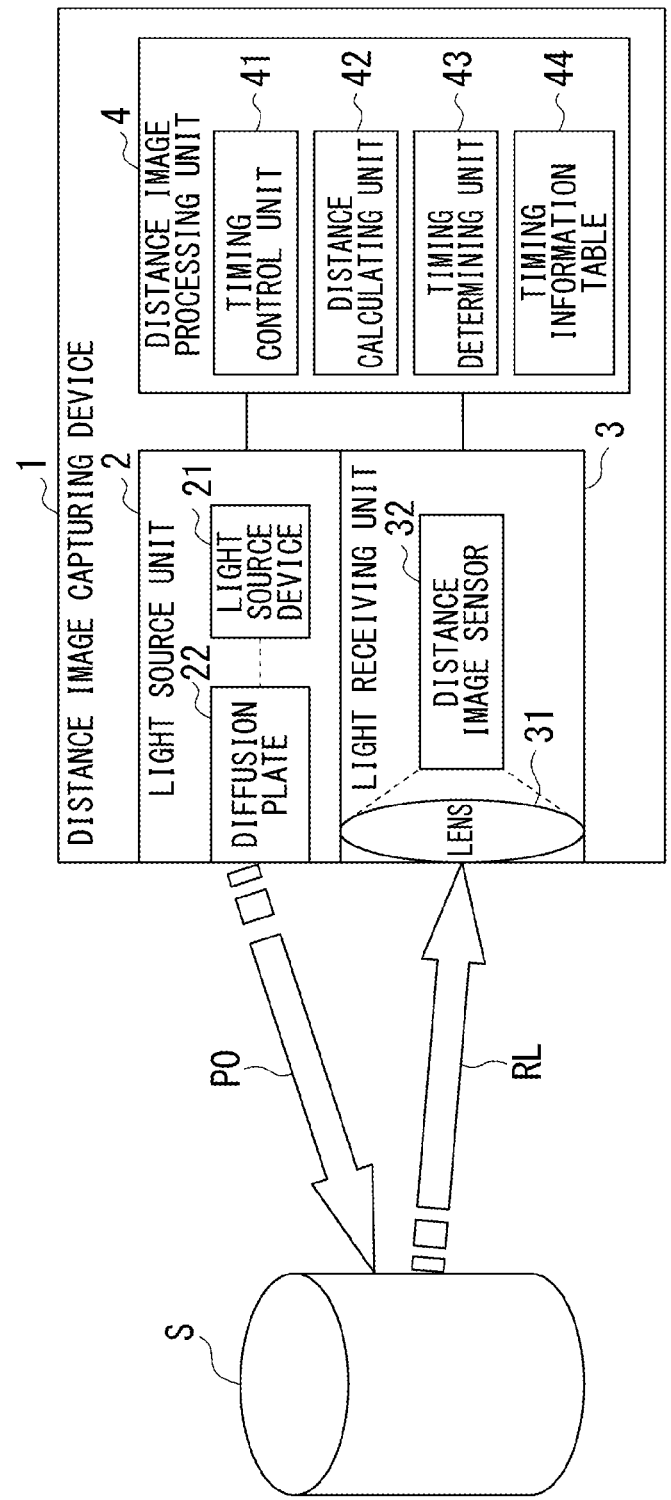
FIG. 1 is a block diagram showing a schematic configuration of a distance image capturing device 1 according to a first embodiment of the present invention.

FIG. 1 is a block diagram showing a schematic configuration of a distance image capturing device according to the first embodiment of the present invention. The distance image capturing device 1 having the configuration shown in FIG. 1 is composed of a light source unit 2, a light receiving unit 3, and a distance image processing unit 4. In addition, a subject S that is a target object of distance measurement of the distance image capturing device 1 is also shown in FIG. 1.

The light source unit 2 emits a light pulse PO to a space of an imaging target in which the subject S that is a target of distance measurement of the distance image capturing device 1 performed is present in accordance with control from the distance image processing unit 4. The light source unit 2, for example, is a semiconductor laser module of a surface emission type such as a vertical cavity surface emitting laser (VCSEL). The light source unit 2 includes a light source device 21 and a diffusion plate 22.

The light source device 21 is a light source that emits laser light having a near-infrared wavelength band (for example, the wavelength is in a wavelength band of 850 nm to 940 nm) that becomes the light pulse PO emitted to the subject S. The light source device 21, for example, is a semiconductor laser light-emitting device. The light source device 21 emits laser light having a pulse shape in accordance with control from the timing control unit 41.

The diffusion plate 22 is an optical component that diffuses laser light of a near-infrared wavelength band emitted by the light source device 21 in an area of an emission face of the subject S. Pulse-shaped laser light diffused by the diffusion plate 22 exits from the light source unit 2 as the light pulse PO and is emitted to the subject S.

The light receiving unit 3 receives reflective light RL of the light pulse PO reflected by the subject S that is a target of distance measurement of the distance image capturing device 1 and outputs a pixel signal according to the received reflective light RL. The light receiving unit 3 includes a lens 31 and a distance image sensor 32.

The lens 31 is an optical lens leading incident reflective light RL to the distance image sensor 32. The lens 31 causes the incident reflective light RL to exit to the distance image sensor 32 side and be received by (incident on) a pixel provided in a light reception area of the distance image sensor 32.

The distance image sensor 32 is an imaging device used in the distance image capturing device 1. The distance image sensor 32 is an imaging device that includes a plurality of pixels in a two-dimensional light reception area and has a divisional configuration in which one photoelectric conversion device, a plurality of electric charge accumulating units corresponding to one photoelectric conversion device, and a constituent element dividing electric charge among the electric charge accumulating units are disposed in each of the pixels. The distance image sensor 32 divides electric charge generated by a photoelectric conversion device configuring a pixel among the electric charge accumulating units and outputs a pixel signal corresponding to the amount of electric charge divided among the electric charge accumulating units in accordance with control from the timing control unit 41.

In addition, a plurality of pixels are disposed in a two-dimensional matrix pattern in the distance image sensor 32, and a pixel signal corresponding to one frame corresponding to each pixel is output.

The distance image processing unit 4 is a control unit that controls the entire distance image capturing device 1. In addition, the distance image processing unit 4 is also an arithmetic operation unit that calculates a distance from a subject S. The distance image processing unit 4 includes a timing control unit 41, a distance calculating unit 42, a timing determining unit 43, and a timing information table 44.

The timing control unit 41 controls a timing at which the light source unit 2 emits the light pulse PO to the subject S, a timing at which the distance image sensor 32 included in the light receiving unit 3 receives the reflective light RL, and the like.

The distance calculating unit 42 outputs distance information acquired by calculating a distance from the subject S on the basis of a pixel signal output from the distance image sensor 32.

The timing determining unit 43 determines a timing at which the reflective light RL is received such that the influence of interference light is reduced. The timing determining unit 43 notifies the timing control unit 41 of the determined timing. The timing control unit 41 controls a timing at which the reflective light RL is received in accordance with the timing notified of by the timing determining unit 43.

Here, interference light according to this embodiment represents light that is intermittently incident on the distance image capturing device 1 in a path other than that of the reflective light RL. For example, interference light is a light pulse emitted from another distance image capturing device to the distance image capturing device 1 in a situation in which a plurality of distance image capturing devices are adjacently present.

The timing determining unit 43 determines whether or not interference light is included in light received at a predetermined timing before a measurement is performed. In a case in which it is determined that interference light is included in the light received at the predetermined timing, the timing determining unit 43 determines to shift a light reception timing such that the interference light is not included in the received light. On the other hand, in a case in which it is determined that interference light is not included, the timing determining unit 43 determines not to shift the light reception timing. In this way, the chance of interference light being included in light received at the light reception timing determined by the timing determining unit 43 is reduced.

For example, in a case in which it is determined that interference light is included in light received at the predetermined timing, the timing determining unit 43 determines a shift amount of the light reception timing using timing information stored in the timing information table 44. The timing information is information that associates a relation between a timing before change and a timing after change in a case in which it is determined that interference light is included.

The timing information table 44 stores timing information.

By employing such a configuration, in the distance image capturing device 1, reflective light RL acquired by causing a light pulse PO of a near-infrared wavelength band, which is emitted by the light source unit 2 to the subject S, to be reflected by the subject S is received by the light receiving unit 3, and the distance image processing unit 4 outputs distance information acquired by measuring a distance from the subject S.

In addition, although the distance image capturing device 1 having a configuration in which the distance image processing unit 4 is provided on the inside thereof is shown in FIG. 1, the distance image processing unit 4 may be a constituent element provided outside the distance image capturing device 1.

Figure 2:
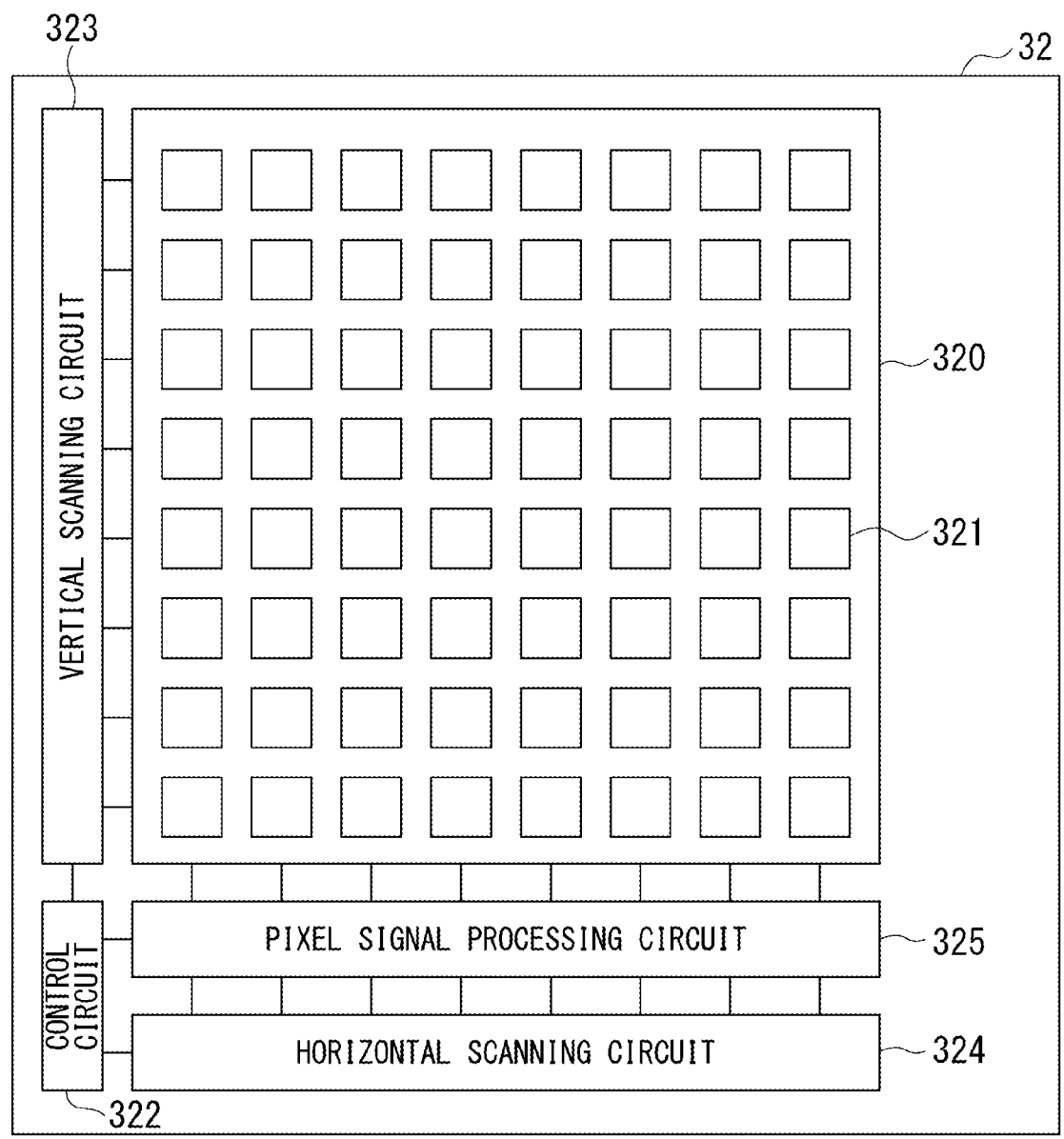
FIG. 2 is a block diagram showing a schematic configuration of an imaging device used in the distance image capturing device 1 according to the first embodiment of the present invention.

Next, the configuration of the distance image sensor 32 used as an imaging device in the distance image capturing device 1 will be described. FIG. 2 is a block diagram showing a schematic configuration of an imaging device (the distance image sensor 32) used in the distance image capturing device 1 according to the first embodiment of the present invention. As shown in FIG. 2, the distance image sensor 32 includes a light reception area 320 in which a plurality of pixels 321 are disposed, a control circuit 322, a vertical scanning circuit 323 that has a dividing operation, a horizontal scanning circuit 324, and a pixel signal processing circuit 325. In addition, in the distance image sensor 32 shown in FIG. 2, an example of the light reception area 320 in which the plurality of pixels 321 are disposed in a two-dimensional matrix pattern of eight rows and eight columns is shown.

In the following description, the pixel signal processing circuit 325 included in the distance image sensor 32 will be described as performing a noise suppression process for a voltage signal output from the pixel 321, thereafter performing an A/D conversion process, and outputting a resultant signal, in other words, outputting a voltage signal converted into a digital value.

Figure 3:
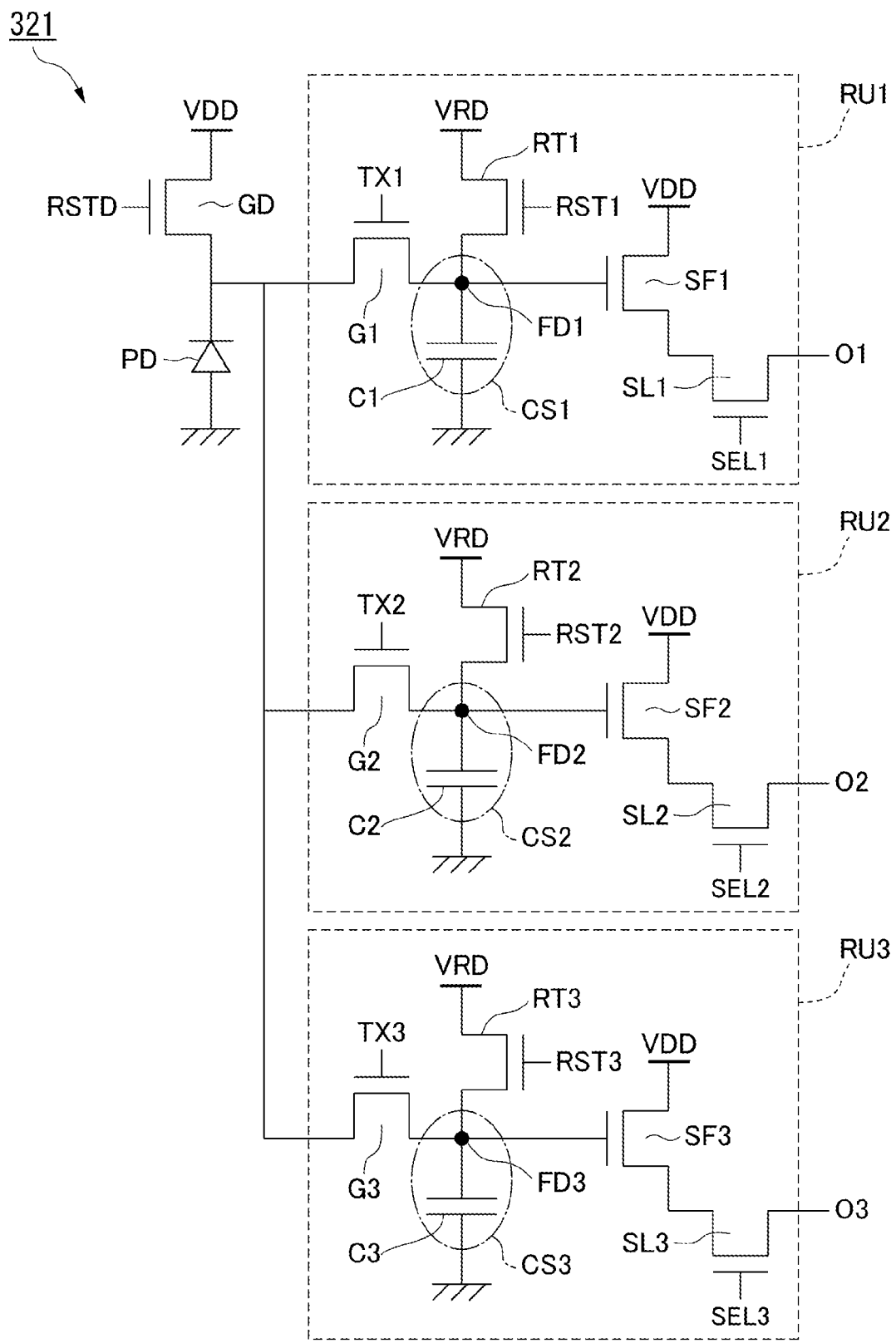
FIG. 3 is a circuit diagram showing one example of the configuration of a pixel 321 disposed in a light reception area of an imaging device used in the distance image capturing device 1 according to the first embodiment of the present invention.

Next, the configuration of the pixel 321 disposed within the light reception area 320 included in the distance image sensor 32 will be described. FIG. 3 is a circuit diagram showing one example of the configuration of the pixel 321 disposed within the light reception area 320 of an imaging device (the distance image sensor 32) used in the distance image capturing device 1 according to the first embodiment of the present invention. FIG. 3 shows one example of the configuration of one pixel 321 among a plurality of pixels 321 disposed within the light reception area 320. The pixel 321 is one example of a configuration including three-pixel signal reading units.

The pixel 321 includes one photoelectric conversion device PD, a drain gate transistor GD, and three-pixel signal reading units RU that output voltage signals from corresponding output terminals O. Each of the pixel signal reading units RU includes a reading gate transistor G, a floating diffusion FD, an electric charge accumulating capacitor C, a reset gate transistor RT, a source follower gate transistor SF, and a selection gate transistor SL. In each of the pixel signal reading units RU, an electric charge accumulating unit CS is composed of the floating diffusion FD and the electric charge accumulating capacitor C.

In addition, in FIG. 3, the individual pixel signal reading units RU are distinguished from each other by assigning the numbers "1," "2," and "3" to reference signs "RU" of three-pixel signal reading units RU. In addition, similarly for the constituent elements included in any one of the three-pixel signal reading units RU, the pixel signal reading unit RU to which each constituent element corresponds is distinguished by indicating the number representing the pixel signal reading unit RU after its reference sign. In the pixel 321 shown in FIG. 3, the pixel signal reading unit RU1 that outputs a voltage signal from an output terminal O1 includes a reading gate transistor G1, a floating diffusion FD1, an electric charge accumulating capacitor C1, a reset gate transistor RT1, a source follower gate transistor SF1, and a selection gate transistor SL1. In the pixel signal reading unit RU1, an electric charge accumulating unit CS1 is composed of a floating diffusion FD1 and an electric charge accumulating capacitor C1. The pixel signal reading unit RU2 and the pixel signal reading unit RU3 have similar configurations.

The photoelectric conversion device PD is a photodiode of an embedded type that generates electric charge by performing photoelectric conversion of incident light and accumulates the generated electric charge. In addition, the structure of the photoelectric conversion device PD included in the pixel 321 is not particularly defined in the present invention. For this reason, the photoelectric conversion device PD, for example, may be either a PN photo diode having a structure in which a P-type semiconductor and an N-type semiconductor are bonded or a PIN photodiode having a structure in which an I-type semiconductor is interposed between a P-type semiconductor and an N-type semiconductor. In addition, the photoelectric conversion device included in the pixel 321 is not limited to a photodiode, and for example, may be a photoelectric conversion device of a photo gate type. The pixel 321 divides the electric charge generated by performing photoelectric conversion of incident light using the photoelectric conversion device PD among the three electric charge accumulating units CS and outputs voltage signals corresponding to the amounts of divided electric charge to the pixel signal processing circuit 325.

The configuration of the pixel disposed in the distance image sensor 32 is not limited to the configuration including the three-pixel signal reading units RU as shown in FIG. 3, and the pixel may have any configuration as long as the pixel has a configuration including one photoelectric conversion device PD and a plurality of pixel signal reading units RU dividing electric charge generated and accumulated by the photoelectric conversion device PD. In other words, the number of pixel signal reading units RU (electric charge accumulating units CS) disposed in the pixel included in the distance image sensor 32 may be two or four or more.

In addition, in the pixel 321 shown in FIG. 3, one example in which the electric charge accumulating unit CS is composed of the floating diffusion FD and the electric charge accumulating capacitor C is shown. However, the electric charge accumulating unit CS may be composed of at least the floating diffusion FD. In other words, the pixel 321 may have a configuration not including each electric charge accumulating capacitor C.

In addition, in the pixel 321 having the configuration shown in FIG. 3, although one example of the configuration including the drain gate transistor GD is shown, a configuration in which no drain gate transistor GD is included in the pixel disposed in the distance image sensor 32 may be employed in a case in which electric charge accumulated (remaining) in the photoelectric conversion device PD does not need to be discarded.

Figure 4:
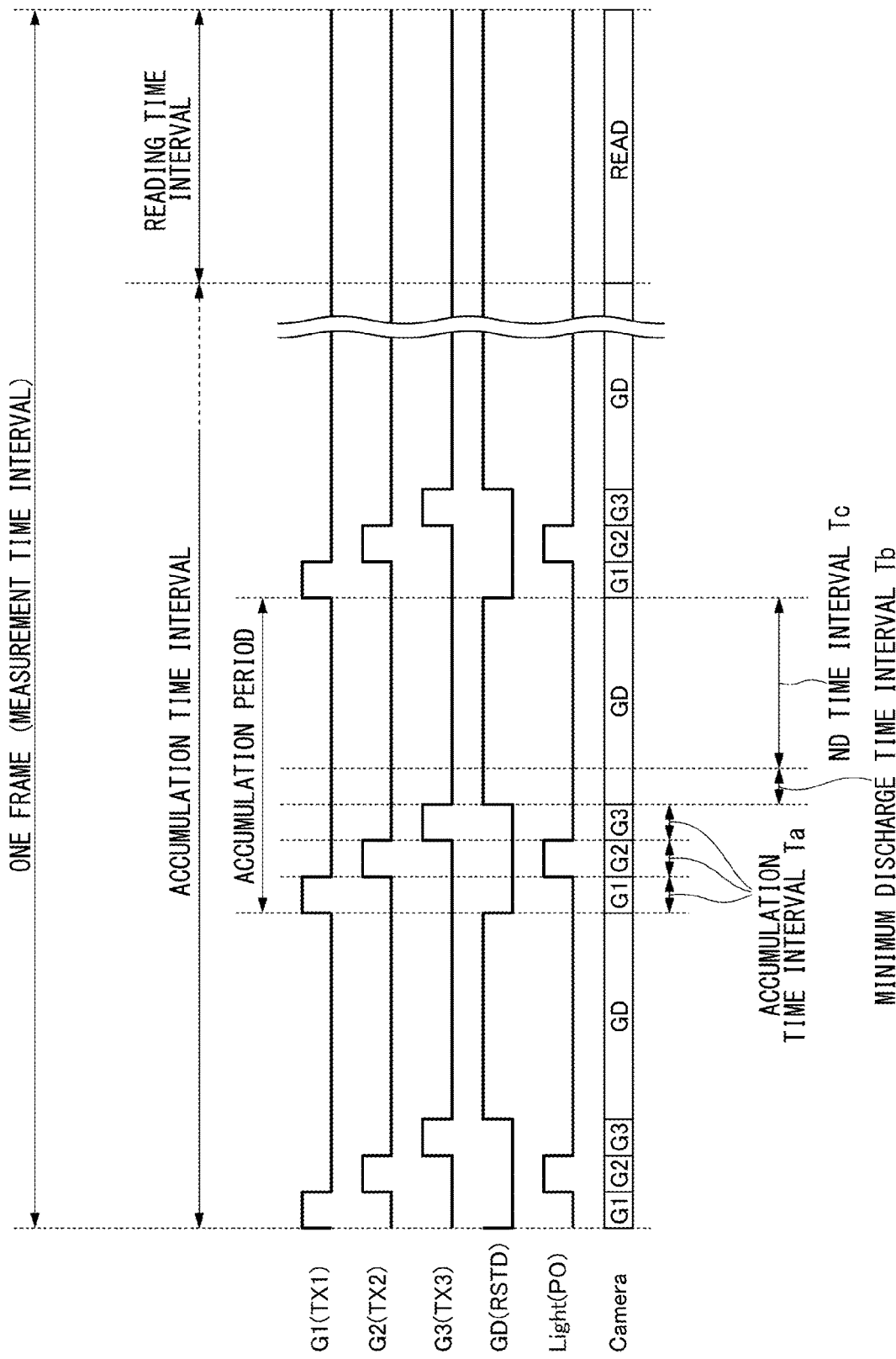
FIG. 4 is a timing diagram showing timings at which a pixel is driven in a conventional distance image capturing device.
Figure 5:
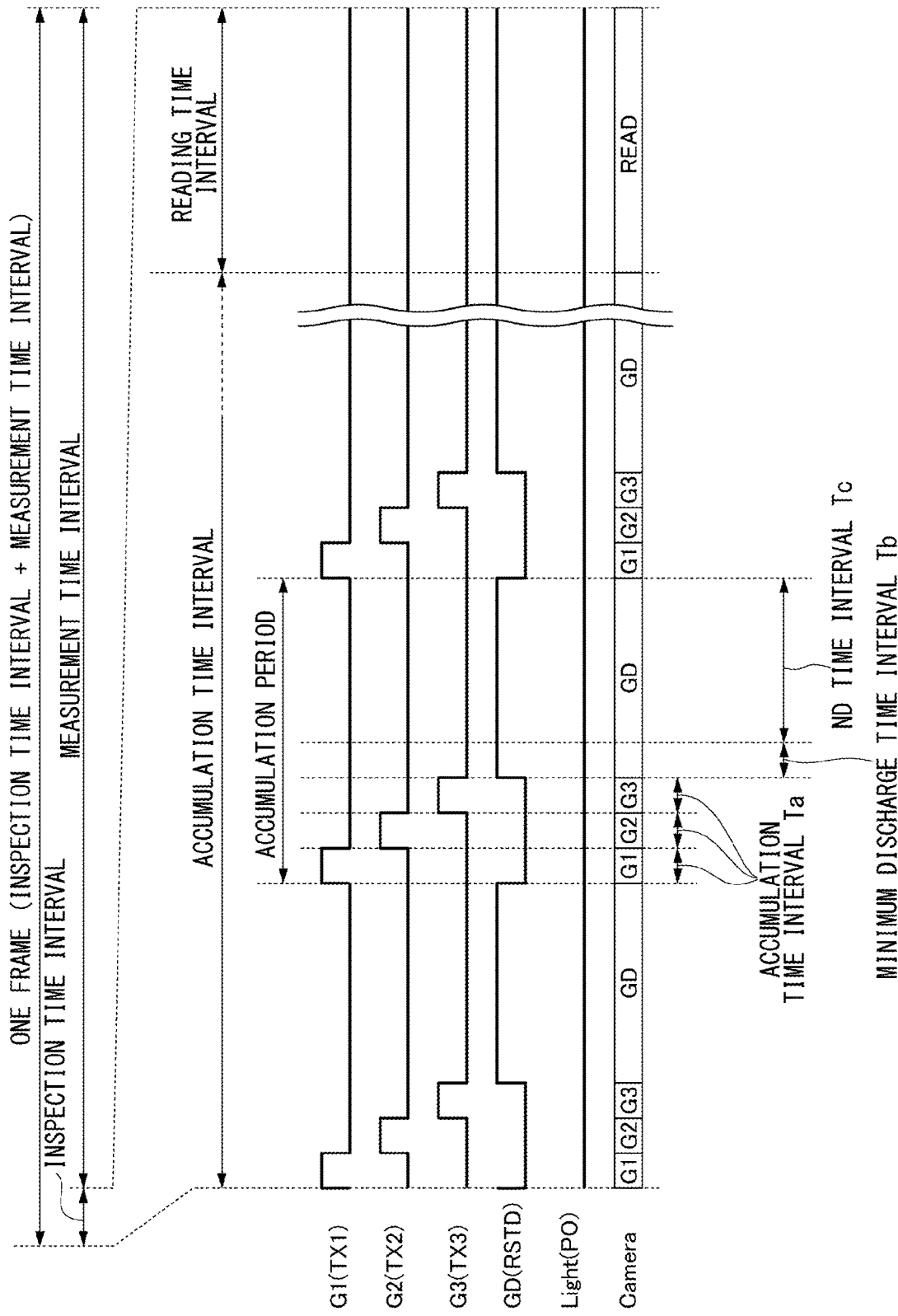
FIG. 5 is a timing diagram showing timings at which a pixel 321 is driven in the distance image capturing device 1 according to the first embodiment of the present invention.

Next, a method of driving (controlling) a pixel 321 in the distance image capturing device 1 will be described with reference to FIGS. 4 and 5. FIG. 4 is a timing diagram showing timings of a drive signal driving a pixel in a conventional distance image capturing device. FIG. 5 is a timing diagram showing timings at which a pixel 321 is driven in the distance image capturing device 1 according to the first embodiment of the present invention.

FIGS. 4 and 5 show the timings of drive signals corresponding to one frame and a timing at which a light pulse PO is emitted. More specifically, a timing of a drive signal TX1 is denoted by an item name "G1(TX1)", a timing of a drive signal TX2 is denoted by an item name "G2(TX2)", a timing of a drive signal TX3 is denoted by an item name "G3(TX3)", a timing of a drive signal RSTD is denoted by "GD(RSTD)", and a timing at which a light pulse PO is emitted is denoted by an item name "Light(PO)". In addition, a series of light reception operation timings in the distance image capturing device 1 are denoted by an item name "Camera". In "Camera", as a series of light reception operation timings, timings at which reading gate transistors G1, G2, and G3 and a drain gate transistor GD come into a turn-on state are respectively denoted by "G1", "G2", "G3", and "GD".

As shown in FIG. 4, add-up time intervals and reading time intervals are included in a process corresponding to one frame in a conventional distance image capturing device. An add-up time interval is a time interval in which electric charge is added up in the electric charge accumulating unit CS. A reading time interval is a time interval in which an amount of electric charge added up in the electric charge accumulating unit CS is read. In addition, in an add-up time interval, a process of an accumulation period is repeated a predetermined number of times, whereby electric charge accumulated in the electric charge accumulating unit CS is added up. The process of the accumulation period is a process in which electric charge is accumulated in the electric charge accumulating unit CS.

Here, the flow of the process in which electric charge is accumulated in the electric charge accumulating unit CS will be described.

In an accumulation period, the vertical scanning circuit 323 accumulates electric charge in order of the electric charge accumulating units CS1, CS2, and CS3. First, the vertical scanning circuit 323 sets the reading gate transistor G1 to be in the turn-on state by setting the drive signal TX1 to a "High" level. In this way, electric charge that is photoelectrically converted by the photoelectric conversion device PD is accumulated in the electric charge accumulating unit CS1 through the reading gate transistor G1. Thereafter, the vertical scanning circuit 323 sets the reading gate transistor G1 to be in an off state by setting the drive signal TX1 to a "Low" level. Accordingly, transfer of electric charge to the electric charge accumulating unit CS1 stops. In this way, the vertical scanning circuit 323 accumulates electric charge in the electric charge accumulating unit CS1.

Next, the vertical scanning circuit 323 accumulates electric charge in the electric charge accumulating unit CS2. The vertical scanning circuit 323 starts the accumulation of electric charge into the electric charge accumulating unit CS2 at a timing at which the accumulation of electric charge in the electric charge accumulating unit CS1 ends. The flow of a subsequent process of accumulating electric charge in the electric charge accumulating unit CS2 is similar to the flow of the process of accumulating electric charge in the electric charge accumulating unit CS1, and thus a description thereof will be omitted.

Next, the vertical scanning circuit 323 accumulates electric charge in the electric charge accumulating unit CS3. The vertical scanning circuit 323 starts accumulation of electric charge into the electric charge accumulating unit CS3 at a timing at which the accumulation of electric charge in the electric charge accumulating unit CS2 ends. The flow of a subsequent process of accumulating electric charge in the electric charge accumulating unit CS3 is similar to the flow of the process of accumulating electric charge in the electric charge accumulating unit CS1, and thus description thereof will be omitted.

Next, the vertical scanning circuit 323 discharges electric charge. The vertical scanning circuit 323 discharges electric charge at a timing at which the accumulation of electric charge into the electric charge accumulating unit CS3 ends. Accordingly, the electric charge that has been photoelectrically converted by the photoelectric conversion device PD is discarded through the drain gate transistor GD.

A time interval in which the drive signal RSTD is in the "High" level is composed of a minimum discharge time interval Tb and an ND time interval Tc. The minimum discharge time interval Tb is a minimum required time interval for resetting the photoelectric conversion device PD and, for example, has the same length as that of the accumulation time interval Ta. The ND time interval Tc is a time interval for adjusting an accumulation period and, for example, is a time interval corresponding to "accumulation time interval Ta×n" (here, n is an arbitrary natural number).

In addition, the light source unit 2 emits a light pulse PO at a timing at which the reading gate transistor G1 is in the off state, in other words, a timing at which the drive signal TX2 is in the "High" level. A time interval in which the light source unit 2 emits a light pulse PO has the same length as that of the accumulation time interval Ta.

Here, a process of calculating a distance from an amount of electric charge accumulated in the electric charge accumulating unit CS will be described. In an accumulation period, by performing the control as described above using the vertical scanning circuit 323, electric charge corresponding to an amount of light incident on the distance image capturing device 1 in a predetermined time section is accumulated in each electric charge accumulating unit CS. From a relation between a timing at which a light pulse PO is emitted and a timing at which electric charge is accumulated in each electric charge accumulating unit CS, an amount of electric charge corresponding to an external light component such as background light before emission of the light pulse PO is maintained in the electric charge accumulating unit CS1. In addition, amounts of electric charge corresponding to reflective light RL and an external light component are divided and stored in the electric charge accumulating units CS2 and CS3.

The divisions (a division ratios) of amounts of electric charge divided among the electric charge accumulating units CS2 and CS3 correspond to a ratio according to a delay time Td until a light pulse PO is reflected on a subject S and is incident on the distance image capturing device 1. By using this principle, the delay time Td can be calculated using the following Equation (1).

$$Td = To \times (Q3 - Q1)/(Q2 \pm Q3 - 2 \times Q1) \quad (1)$$

Here, To represents a time interval in which a light pulse PO is emitted, Q1 represents an amount of electric charge accumulated in the electric charge accumulating unit CS1, Q2 represents an amount of electric charge accumulated in the electric charge accumulating unit CS2, and Q3 represents an amount of electric charge accumulated in the electric charge accumulating unit CS3. In addition, in Equation (1), it is premised that the amount of electric charge corresponding to an external light component in the amounts of electric charge accumulated in the electric charge accumulating units CS2 and CS3 is the same as the amount of electric charge accumulated in the electric charge accumulating unit CS1.

By multiplying the delay time acquired in Equation (1) by the velocity of light (speed), a round trip distance to a subject S can be calculated. Then, by taking ½ of the round-trip distance calculated above, a distance to the subject S can be acquired.

Here, the process of the distance image capturing device 1 according to this embodiment will be described.

As shown in FIG. 5, an inspection time interval and a measurement time interval are included in a process corresponding to one frame in the distance image capturing device 1 according to this embodiment. In the measurement time interval, a process (a process corresponding to one frame) corresponding to conventional measurement shown in FIG. 4 is performed.

In the inspection time interval, before measurement of a distance, the presence/absence of interference light is determined at a light reception timing. Here, the light reception timing is a timing at which electric charge is accumulated in each electric charge accumulating unit CS and is a timing at which the reading gate transistor G is in the turn-on state, in other words, a timing at which the drive signal TX is in the "High" level. The light reception timing is one example of an "accumulation timing".

In this embodiment, in a case in which the presence of interference light is checked in the inspection time interval, the light reception timing is adjusted such that the influence of measurement of the interference light is avoided. Then, measurement is performed at the light reception timing after adjustment. Accordingly, erroneous measurement according to interference light is inhibited.

The inspection time interval is set to have a length shorter (smaller) than the measurement time interval. For example, in a case in which the length of the measurement time interval is about 30 [ms], the length of the inspection time interval is about 90 [us] and is about 0.3 [%] in terms of a ratio. In this way, a measurement period (a time corresponding to one frame) in which a distance is measured is acquired to have a length that is almost the same as that of a conventional measurement period interval.

As shown in FIG. 5, similar to the process of one frame in a conventional distance image capturing device, an add-up time interval, and a reading time interval are included in the inspection time interval. In the reading time interval included in the inspection time interval, similar to the conventional reading time interval shown in FIG. 4, the process of reading an amount of electric charge added up in the electric charge accumulating unit CS is performed.

In the add-up time interval included in the inspection time interval, similar to the conventional add-up time interval shown in FIG. 4, the process of adding up electric charge in the electric charge accumulating unit CS is performed. However, in the add-up time interval included in the inspection time interval, emission of a light pulse PO synchronized with a timing at which electric charge is added up in the electric charge accumulating unit CS is not performed.

In this embodiment, since a light pulse PO is not emitted in the add-up period included in the inspection time interval, in a case in which there is no interference light synchronized with a light reception timing, it is considered that amounts of electric charge corresponding to an external light component that are almost the same are accumulated in the electric charge accumulating units CS1 to CS3.

On the other hand, in a case in which there is interference light synchronized with the light reception timing, in an electric charge accumulating unit CS receiving light at the same timing as that of the interference light among the electric charge accumulating units CS, an amount of electric charge that is larger than those of the other electric charge accumulating units CS is accumulated. By using this principle, the timing determining unit 43 determines whether or not there is interference light synchronized with a reception light timing on the basis of amounts of electric charge accumulated in the electric charge accumulating units CS in the inspection time interval.

The timing determining unit 43 determines an electric charge accumulating unit CS in which the largest amount of electric charge is accumulated in the inspection time interval as being an electric charge accumulating unit CS that has received interference light on the basis of the read amounts of electric charge. Then, the timing determining unit 43 determines a timing at which the reading gate transistor G of the electric charge accumulating unit CS determined to have received interference light comes into the turn-on state as being a timing at which the interference light is present. For example, in a case in which the largest amount of electric charge is accumulated in the electric charge accumulating unit CS1, the timing determining unit 43 determines a timing at which the reading gate transistor G1 comes into the turn-on state as being a timing at which interference light is present. Similarly, the timing determining unit 43 performs determination also for the electric charge accumulating units CS2 and CS3.

In the description presented above, although an electric charge accumulating unit CS that has received interference light is determined on the basis of relative values of the amount of accumulated electric charge, the determination is not limited thereto.

The timing determining unit 43 may determine an electric charge accumulating unit CS that has received interference light on the basis of an absolute value of the amount of accumulated electric charge. In such a case, for example, the timing determining unit 43 determines whether or not the amount of electric charge accumulated in each electric charge accumulating unit CS is equal to or larger than a predetermined threshold set in advance. The timing determining unit 43 determines an electric charge accumulating unit CS in which the amount of accumulated electric charge is equal to or larger than the predetermined threshold as being an electric charge accumulating unit CS that has received interference light.

In this case, the threshold may be arbitrarily set in accordance with the number of division instances in the inspection time interval, the performance of an A/D converter performing an A/D conversion of the amount of electric charge, and the like. For example, the threshold is set to a value (24 [LSB]) that is a predetermined multiple (for example, six times) of a maximum deviation (for example, 4 [LSBrms]) that is one of the accuracy indices of the A/D converter for an AD converted value. In such a case, there may be a plurality of electric charge accumulating units CS that are determined as being electric charge accumulating units CS that have received interference light.

In addition, the timing determining unit 43 may determine an electric charge accumulating unit CS that has received interference light using representative values of the amounts of electric charge accumulated in the electric charge accumulating units CS1, CS2, and CS3 in a plurality of pixels 321. A representative value may be one value calculated on the basis of each amount of accumulated electric charge and, for example, may be a simple arithmetic mean value, a weighted average value, a mode, a median value, or the like. In addition, the timing determining unit 43 may derive the amount of electric charge accumulated in the electric charge accumulating unit CS using a moving average of amounts of electric charge in a pixel. In such a case, a representative value of the amounts of electric charge accumulated in the electric charge accumulating units CS of a target pixel and each of a pixel group disposed on the periphery of a position at which the target pixel is disposed is set as the amount of electric charge accumulated in the electric charge accumulating unit CS of the target pixel.

In addition, in a case in which an electric charge accumulating unit CS that has received interference light is determined using a threshold, the timing determining unit 43 may change the threshold in accordance with an environment in which the distance image capturing device 1 is disposed. The environment described here is a factor having a possibility of giving an influence on an external light component and, for example, is an environment such as an indoor place or an outdoor place or a clear sky, rainy weather, or the like in the case of an outdoor place.

For example, in outdoor measurement, a maximum deviation of the AD converter depends on the square root of a dynamic range (bit number) of the A/D converter in accordance with the influence of light shot noise. For example, the maximum deviation of the A/D converter of 12 bits is √(4096)=64 [LSBrms] per pixel in the case of a 12-bit A/D converter. By taking a moving average of 16 pixels, the influence of a light shot noise is offset and becomes ¼, and the maximum deviation after the A/D conversion can be regarded as 16 [LSBrms]. In this case, the threshold in outdoor measurement is set to a value (96 LSB) of a predetermined multiple (for example, 6 times) of the maximum deviation (16 [LSBrms]).

The timing determining unit 43 may determine an electric charge accumulating unit CS that has received interference light on the basis of a ratio of the amounts of accumulated electric charge. In this case, for example, the timing determining unit 43 calculates an average ratio of the other amount of electric charge to the largest amount of electric charge on the basis of the amount of electric charge accumulated in each electric charge accumulating unit CS. In a case in which the calculated ratio is lower than a predetermined threshold, the timing determining unit 43 determines the electric charge accumulating unit CS that has accumulated the largest amount of electric charge as being an electric charge accumulating unit CS that has received interference light.

In a case in which it is determined that a timing at which interference light is present, the timing determining unit 43 changes the current light reception timing such that a timing at which the interference light is present and a light reception timing at the time of measurement do not overlap each other. Accordingly, erroneous measurement according to interference light is inhibited.

In this embodiment, the timing determining unit 43 changes the light reception timing without changing the length of the accumulation period by causing the phase of the light reception timing to lag or lead. Hereinafter, the process of changing a reception timing using the timing determining unit 43 will be described with reference to FIGS. 6A and 6B.

Figure 6A:
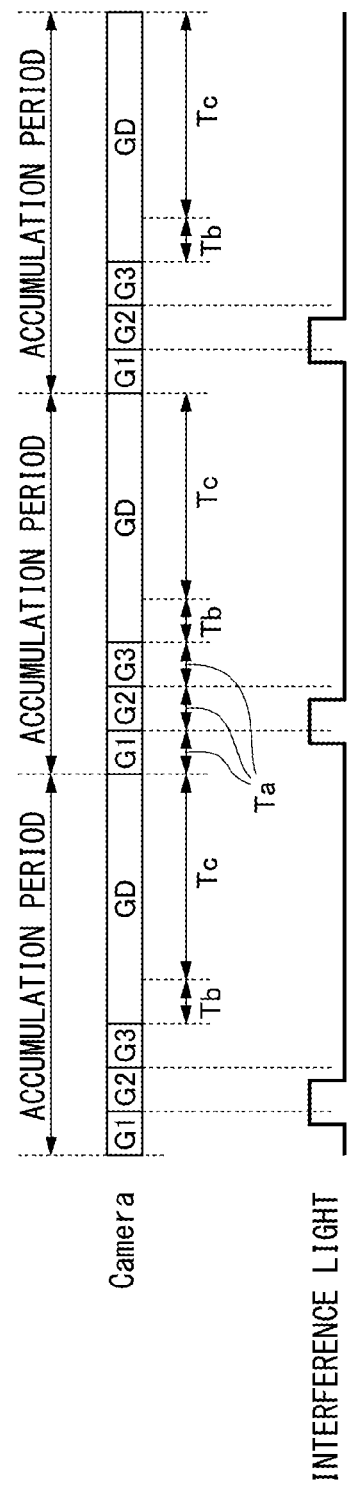
FIG. 6A is a diagram showing timings before a light reception timing is changed in the distance image capturing device 1 according to the first embodiment of the present invention.
Figure 6B:
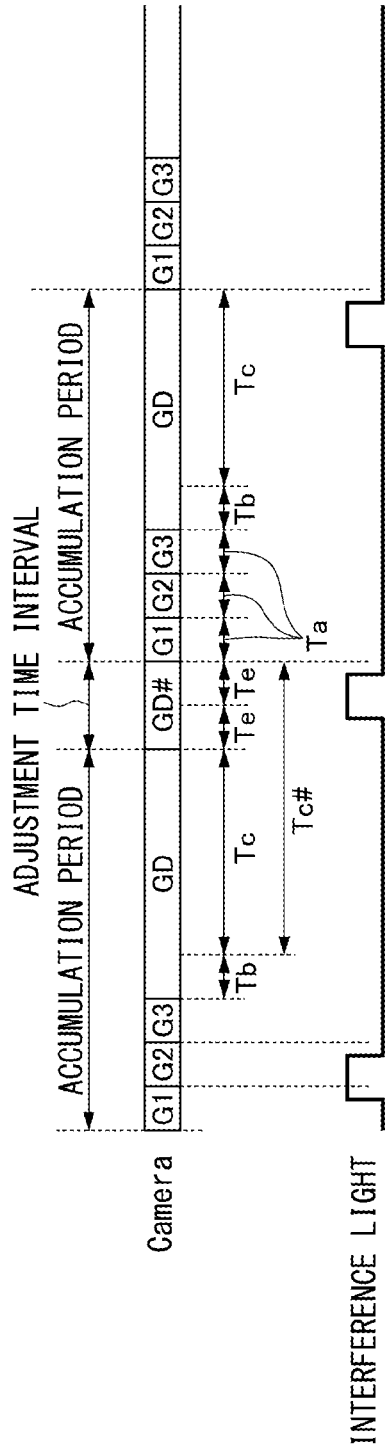
FIG. 6B is a diagram showing timings after a light reception timing is changed in the distance image capturing device 1 according to the first embodiment of the present invention.

FIGS. 6A and 6B are diagrams for showing the process of changing a light reception timing according to the first embodiment of the present invention. FIG. 6A shows timings before the change, and FIG. 6B shows timings after the change. In addition, FIGS. 6A and 6B show light reception timings and timings at which interference light is emitted. Furthermore, details denoted by item names "Camera" and the like in FIGS. 6A and 6B are similar to those shown in FIGS. 4 and 5, and thus description thereof will be omitted.

In FIG. 6A, an accumulation period is composed of accumulation time intervals Ta×3, a minimum discharge time interval Tb, and an ND time interval Tc. In FIG. 6A shows an example in which interference light is present over timings at which reading gate transistors G1 and G2 come into the turn-on state. In this case, the timing determining unit 43 determines a timing at which the reading gate transistor G2 (or the reading gate transistors G1 and G2) comes into the turn-on state as a timing at which interference light is present.

The timing determining unit 43 changes a timing (phase) at which the reading gate transistor G2 comes into the turn-on state to lag by the accumulation time interval Ta×2 or lead by the accumulation time interval Ta×2 such that the light reception timing and a timing at which interference light is present do not overlap each other. In this way, the timing can be caused to be shifted such that interference light is not present at a light reception timing after the change.

As shown in FIG. 6B, for example, the timing determining unit 43 temporarily changes the ND time interval to an adjusted ND time interval Tc # by disposing an adjustment time interval at a specific position of an accumulation time and adding a delay GD #, thereby changing a light reception timing. The adjusted ND time interval Tc # is a time interval having a length acquired by adding unit adjustment time intervals Te×2 to the ND time interval Tc. When the unit adjustment time interval Te has the same length as that of the accumulation time interval Ta, the light reception timing is caused to lag by accumulation time intervals Ta×2, and interference light is not present at the light reception timing after the change. Hereinafter, although the unit adjustment time interval Te will be described as being the accumulation time interval Ta, the unit adjustment time interval Te is not limited thereto and may have an arbitrary length that can be adjusted in accordance with the accumulation time interval Ta.

In addition, although a case in which the phase of the light reception timing is caused to lag by adding GD # in the adjustment time interval has been described as an example, the light reception timing may be adjusted by causing the phase to lead by decreasing GD # in the adjustment time interval.

When the light reception timing is changed as described above, a timing at which interference light is present overlaps with a discharge time interval in which the drain gate transistor GD comes into the turn-on state. In other words, a timing at which interference light is present and a light reception timing after change do not overlap each other with respect to time. For this reason, there is no reception of interference light in an accumulation time interval.

In this way, the timing determining unit 43 determines a light reception timing in accordance with the amount of electric charge added up in each electric charge accumulating unit CS in the inspection time interval and the order of accumulation time intervals of the electric charge accumulating units CS in the accumulation period.

More specifically, the timing determining unit 43 determines light reception timings such that positions of the accumulation time interval Ta (in other words, the timing at which interference light is present) of an electric charge accumulating unit CS in which the amount of accumulated electric charge in the inspection time interval is a maximum and the accumulation time interval Ta of each electric charge accumulating unit CS after determination (change) of the light reception timing in the accumulation period with respect to time do not overlap each other.

More specifically, in a case in which the amount of electric charge accumulated in the electric charge accumulating unit CS1 in the inspection time interval is a maximum, the timing determining unit 43 causes the light reception timing to lag by the accumulation time interval Ta×1 or lead by the accumulation time interval Ta×3. In this way, the timing at which interference light is present and the accumulation time interval Ta of each electric charge accumulating unit CS do not overlap each other with respect to time.

Similarly, in a case in which the amount of electric charge accumulated in the electric charge accumulating unit CS2 in the inspection time interval is a maximum, the timing determining unit 43 causes the light reception timing to lag by the accumulation time interval Ta×2 or lead by the accumulation time interval Ta×2. In addition, in a case in which the amount of electric charge accumulated in the electric charge accumulating unit CS3 in the inspection time interval is a maximum, the timing determining unit 43 causes the light reception timing to lag by the accumulation time interval Ta×3 or lead by the accumulation time interval Ta×1.

Here, in a case in which the light reception timing is caused to lag or lead, it is necessary for the length of the adjusted ND time interval Tc # to be in a settable range. In other words, the timing determining unit 43 needs to configure the adjusted ND time interval Tc # not to have a value that is smaller than zero (in other words, a negative value) or exceeds a settable upper limit value. For this reason, the timing determining unit 43 determines whether or not the length of the adjusted ND time interval Tc # is in the settable range in a case in which the light reception timing is caused to lag or lead.

More specifically, in a case in which the amount of electric charge accumulated in the electric charge accumulating unit CS1 in the inspection time interval is a maximum, the timing determining unit 43 causes the light reception timing to lag by the accumulation time interval Ta×1 in a case in which the length of the adjusted ND time interval Tc # has a negative value when the light reception timing is caused to lead by the accumulation time interval Ta×3. Alternatively, in a case in which the length of the adjusted ND time interval Tc # exceeds the upper limit value of the settable range when the light reception timing is caused to lag by the accumulation time interval Ta 1, the timing determining unit 43 causes the light reception timing to lead by the accumulation time interval Ta×3. This is similarly applied also to a case in which the amount of accumulated electric charge accumulated in the electric charge accumulating unit CS2 or CS3 in the inspection time interval is a maximum.

In addition, in this embodiment, it is necessary to appropriately set the setting range of the ND time interval such that a situation in which the ND time interval Tc is not in the settable range does not occur even when the light reception timing is caused to lag or lead. For example, in a case in which electric charge is accumulated using three electric charge accumulating units CS, a lower limit of the ND time interval is set to the accumulation time interval Ta×0 (zero), and an upper limit thereof is set to be equal to or longer than the accumulation time interval Ta×3.

FIG. 7 is a diagram showing an example of the configuration of information (timing information) stored in the timing information table 44 according to the first embodiment of the present invention. In FIG. 7, in a settable range as an ND time interval Tc, the length of an adjusted ND time interval Tc # according to the electric charge accumulating unit CS in which the amount of accumulated electric charge is a maximum. In addition, FIG. 7 represents the lengths of the ND time interval Tc and the adjusted ND time interval Tc # as 0D to 6D, and the like. Here, 0D, 1D, 2D, . . . respectively correspond to an accumulation time interval Ta×0, an accumulation time interval Ta×1, an accumulation time interval Ta×2, . . . . In other words, K is a natural number, and KD corresponds to the length of the accumulation time interval Ta×K.

As shown in FIG. 7, in a case in which the setting range of the ND time interval is 0D to 6D, the timing determining unit 43 may determine an adjusted ND time interval Tc # on the basis of the timing information table 44 shown in FIG. 7. For example, in a case in which the length of the ND time interval Tc in the inspection time interval is 4D, and an electric charge accumulating unit CS in which the amount of accumulated electric charge is a maximum is the electric charge accumulating unit CS1, the timing determining unit 43 sets the length of the adjusted ND time interval Tc # to 1D. In a case in which the length of the ND time interval Tc in the inspection time interval is 5D, and an electric charge accumulating unit CS in which the amount of accumulated electric charge is a maximum is the electric charge accumulating unit CS2, the timing determining unit 43 sets the length of the adjusted ND time interval Tc # to 3D. In a case in which the length of the ND time interval Tc in the inspection time interval is 6D, and an electric charge accumulating unit CS in which the amount of accumulated electric charge is a maximum is the electric charge accumulating unit CS3, the timing determining unit 43 sets the length of the adjusted ND time interval Tc # to 5D.

Figure 8:
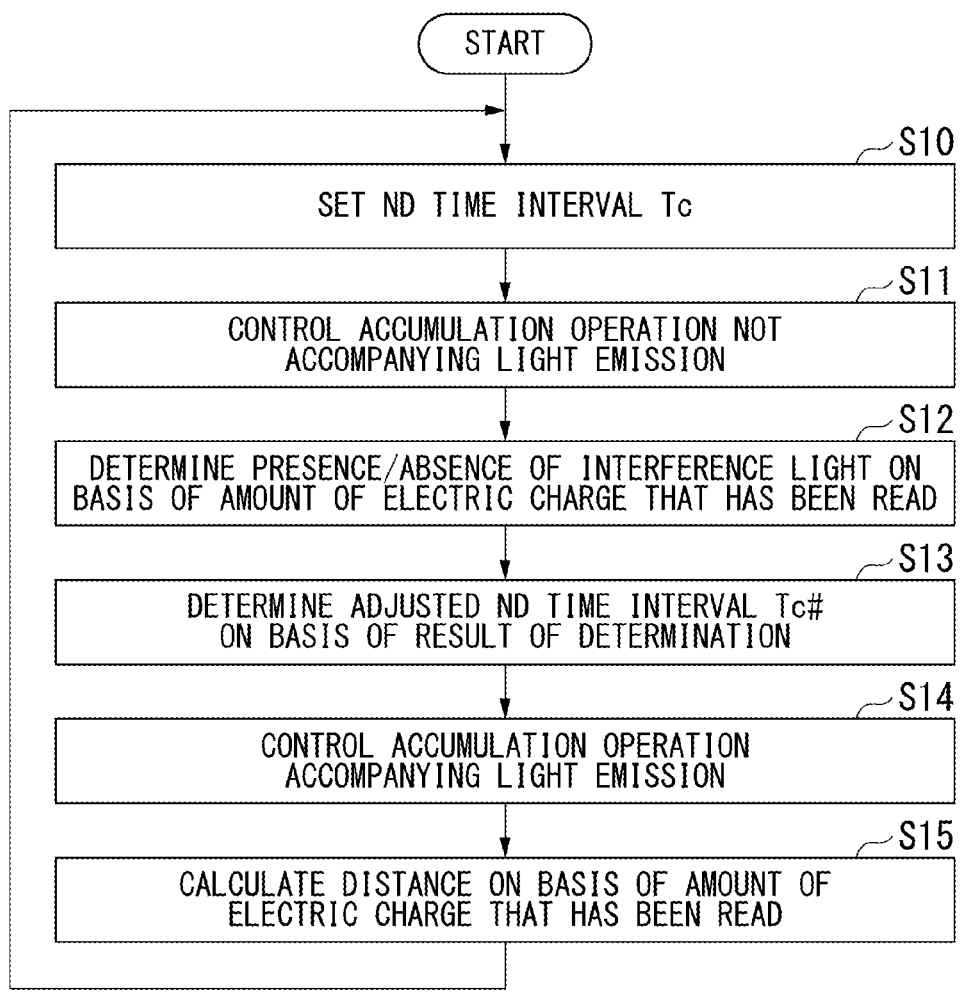
FIG. 8 is a flowchart showing the flow of a process performed by the distance image capturing device 1 according to the first embodiment of the present invention.

FIG. 8 is a flowchart showing the flow of a process performed by the distance image capturing device 1 according to the first embodiment of the present invention.

First, the distance image capturing device 1 sets an ND time interval Tc (Step S10). The ND time interval Tc may be a predetermined time interval set in advance and may be a time interval having the same length as that of the ND time interval Tc used for the previous measurement.

Next, the distance image capturing device 1 controls an accumulation operation not accompanying light emission (Step S11). The accumulation operation not accompanying light emission is an operation of receiving light in the inspection time interval and, as shown in the timing diagram shown in FIG. 5, is an operation of accumulating electric charge in the electric charge accumulating unit CS without emitting a light pulse PO.

Next, the distance image capturing device 1 determines the presence/absence of interference light on the basis of the read amount of electric charge (Step S12). The amount of electric charge read here is the amount of electric charge accumulated in each electric charge accumulating unit CS in the inspection time interval. In this case, in a case in which interference light is not received, almost the same amount of the electric charge is accumulated in any one of the electric charge accumulating units CS. On the other hand, in a case in which interference light is received, an amount of electric charge larger than that of the other electric charge accumulating units CS is accumulated in a specific electric charge accumulating unit CS that has received the interference light.

Next, the distance image capturing device 1 determines an adjusted ND time interval Tc # on the basis of a result of the determination of the presence/absence of interference light (Step S13). For example, the timing determining unit 43 of the distance image capturing device 1 determines an electric charge accumulating unit CS having a light reception timing overlapping with a timing at which interference light is present. The timing determining unit 43 determines an adjusted ND time interval Tc # by referring to the timing information table 44 on the basis of the result of the determination. The timing determining unit 43 notifies the timing control unit 41 of the determined adjusted ND time interval Tc #. The timing control unit 41 controls the length of the time interval in which the drain gate transistor GD comes into the turn-on state on the basis of the notified adjusted ND time interval Tc #.

Next, the distance image capturing device 1 controls an accumulation operation accompanying light emission (Step S14). The accumulation operation accompanying light emission is an operation of receiving light in a measurement time interval and, as shown in the timing diagram shown in FIG. 4, is an operation of performing an operation of accumulating electric charge in the electric charge accumulating unit CS in synchronization of emission of a light pulse PO.

Then, the distance image capturing device 1 determines a distance of subject S on the basis of the read amount of electric charge (Step S15). The amount of electric charge read here is an amount of electric charge accumulated in each electric charge accumulating unit CS in the measurement time interval. In this case, an amount of electric charge corresponding to an external light component is accumulated in the electric charge accumulating unit CS1. Amounts of electric charge divided in accordance with a proportion according to distances of subject S are accumulated in the electric charge accumulating units CS2 and CS3. The distance calculating unit 42 of the distance image capturing device 1 calculates a delay time Td of reflective light RL by substituting the amount of electric charge accumulated in each electric charge accumulating unit CS into Equation (1) and acquires a distance of subject S using the calculated delay time Td.

As described above, in the first embodiment, the timing determining unit 43 adjusts a light reception timing on the basis of a result of determination on whether or not interference light is present at the light reception timing. The timing determining unit 43 disposes an inspection time interval before a measurement time interval within one frame and determines whether or not interference light is present. In this way, the distance image capturing device 1 according to the first embodiment can perform adjustment in advance such that light is received with a timing, at which interference light is emitted, avoided and has higher convenience than that in a case in which the presence/absence of interference light is determined in accordance with a change rate of a measured distance.

In addition, in the first embodiment, the timing determining unit 43 determines a light reception timing in accordance with the amounts of electric charge added up in the electric charge accumulating units CS in the inspection time interval and positional relations of accumulation time intervals Ta of the electric charge accumulating units CS in the accumulation period with respect to time. In this way, the distance image capturing device 1 according to the first embodiment can quantitatively determine a light reception timing using objective indices including the amounts of electric charge and the positional relations of the accumulation time intervals Ta with respect to time and thus can measure a distance with high accuracy by avoiding the presence of interference light.

In addition, in the first embodiment, the timing determining unit 43 determines an accumulation timing such that positions of the accumulation time interval Ta of an electric charge accumulating unit CS in which the amount of electric charge added up in the inspection time interval is a maximum and the accumulation time interval Ta of each electric charge accumulating unit CS after change of the accumulation timing do not overlap each other with respect to time in the accumulation period. In this way, the distance image capturing device 1 according to the first embodiment can cause a timing at which interference light is present not to overlap with the accumulation time interval Ta of each electric charge accumulating unit CS, and accordingly, the influence of interference light can be avoided reliably.

In addition, in the first embodiment, the timing determining unit 43 determines an accumulation timing on the basis of a timing information table 44 in which identification information of an electric charge accumulating unit CS in which the amount of electric charge added up in the inspection time interval is a maximum and information relating to an accumulation timing are associated with each other. In this way, the distance image capturing device 1 according to the first embodiment can easily determine an accumulation timing by referring to the timing information table 44.

In addition, in the first embodiment, the length of the inspection time interval is shorter than the length of the measurement time interval, and accordingly, the measurement can be performed with a period that is almost equivalent to the period of conventional measurement, and an obstacle is not caused in the measurement.

Furthermore, in the description presented above, although an example in which one inspection time interval is disposed before one measurement time interval has been described above, the configuration is not limited thereto. Thus, one inspection time interval may be disposed before a plurality of the measurement time intervals. In addition, in a case in which a light reception timing is changed in the inspection time interval, an inspection time interval may be disposed again at a light reception timing after the change, and it may be checked whether or not another interference light is present at the light reception timing after the change.

Second Embodiment

Next, a second embodiment will be described. In this embodiment, individual accumulation time intervals are changed in the measurement time interval, which is different from the embodiment described above. In the following description, only components different from those of the embodiment described above will be described, the same reference numerals will be assigned to components similar to those of the embodiment described above, and description thereof will be omitted.

Figure 9:
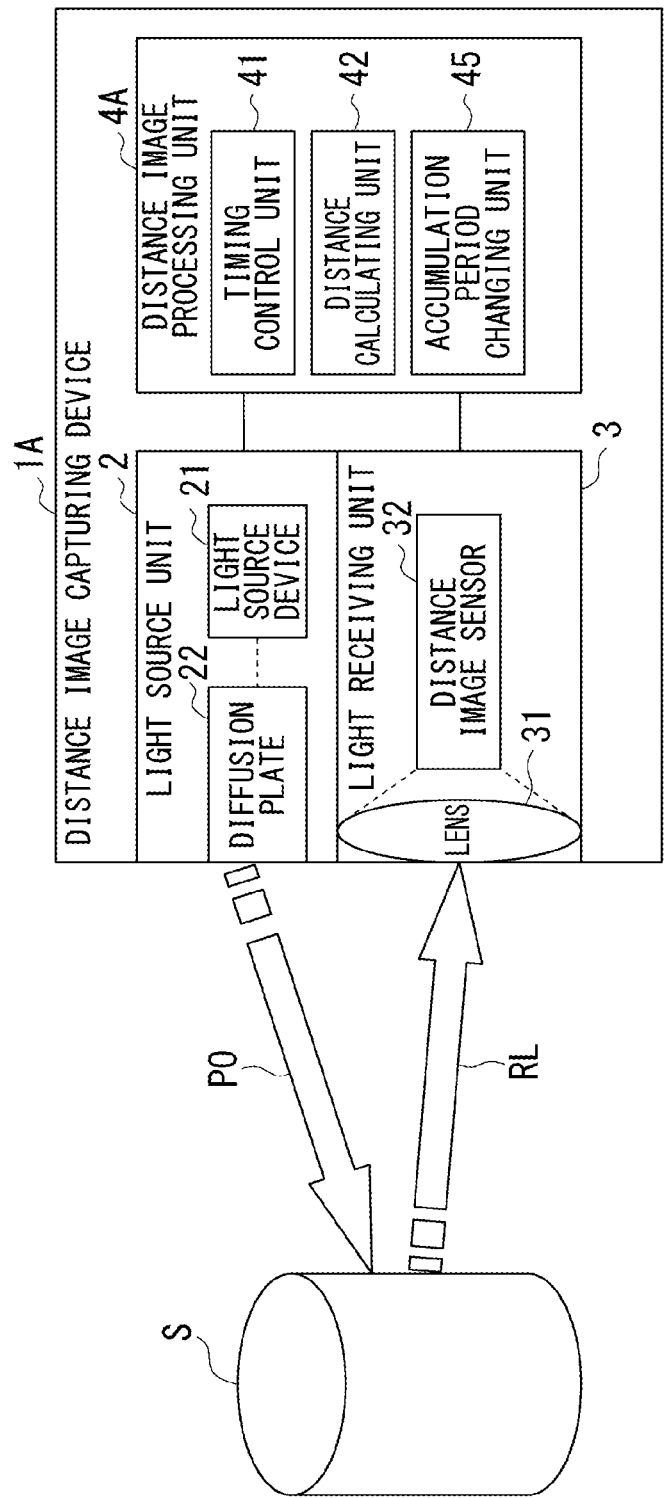
FIG. 9 is a block diagram showing an example of the configuration of a distance image capturing device 1A according to a second embodiment of the present invention.

FIG. 9 is a block diagram showing an example of the configuration of a distance image capturing device 1A according to the second embodiment of the present invention. The distance image capturing device 1A includes a distance image processing unit 4A. The distance image processing unit 4A includes an accumulation period changing unit 45.

The accumulation period changing unit 45 changes individual accumulation periods in a range in which a total length of the accumulation periods is not changed in a measurement time interval. In other words, the accumulation period changing unit 45 changes individual accumulation periods such that there is no change in an average of the accumulation periods in a measurement time interval before and after the change of the accumulation period.

In addition, the accumulation period changing unit 45 changes lengths of individual accumulation periods in a measurement time interval regardless of the presence/absence of interference light. In other words, it is not necessary to determine the presence/absence of interference light in this embodiment. Accordingly, an inspection time interval may not be arranged at a timing at which a pixel 321 is driven in this embodiment, which is similar to FIG. 4. In addition, similar to the first embodiment, an accumulation timing may be changed in a timing information table using an inspection time interval in this embodiment. Hereinafter, a method of changing an accumulation period using the accumulation period changing unit 45 will be described with reference to FIGS. 10A to 10D.

FIGS. 10A to 10D are timing diagrams showing timings at which a pixel 321 is driven in the distance image capturing device 1A according to the second embodiment of the present invention. FIGS. 10A to 10D show timings of light pulses and light reception timings in a conventional distance image capturing device (Camera1) and the distance image capturing device 1A (Camera2). In addition, FIGS. 10A to 10D show a series of timings and show appearances in which a time series advances in order of FIGS. 10A, 10B, 10C, and 10D.

Figure 10A:
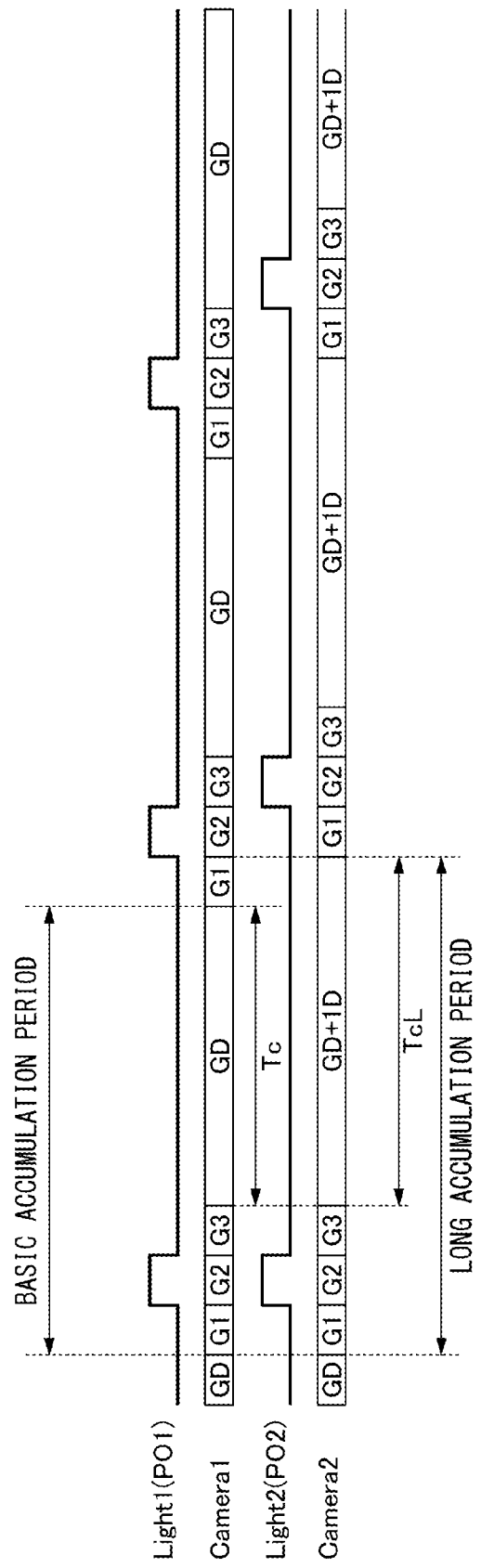
FIG. 10A is a timing diagram showing timings at which a pixel 321 is driven in the distance image capturing device 1A according to the second embodiment of the present invention.

As shown in FIG. 10A, in the conventional distance image capturing device (Camera1), accumulation is performed with an accumulation period forming a base (basic accumulation period). An ND time interval in the basic accumulation period has a length of a basic ND time interval Tc.

On the other hand, in the distance image capturing device (Camera2) according to this embodiment, the accumulation period changing unit 45 performs accumulation with an accumulation period (long accumulation period) having a time interval longer than the basic accumulation period by an accumulation time interval Ta. An ND time interval in the long accumulation period has a length of a long ND time interval TcL.

As shown in FIG. 10A, the distance image capturing devices Camera1 and Camera2 start the measurement with light reception timings being the same timings. In this case, in a first accumulation period, mutual light pulses are at the same timing, and a light pulse of the other party becomes interference light. In the next accumulation period, a light pulse emitted by the distance image capturing device Camera1 becomes interference light at a timing at which a reading gate transistor G1 of the distance image capturing device Camera2 comes into the turn-on state. In a further next accumulation period, a light pulse is emitted by the distance image capturing device Camera1 at a timing at which a drain gate transistor GD of the distance image capturing device Camera2 comes into the turn-on state and does not become interference light. In other words, since the accumulation period of the distance image capturing device Camera2 is longer than the accumulation period of the distance image capturing device Camera1 by an accumulation time interval Ta, there is a deviation between timings of emitted light pulses thereof for each accumulation period, and thus there is a case in which a light pulse becomes interference light, and there is a case in which a light pulse does not become interference light.

Figure 10B:
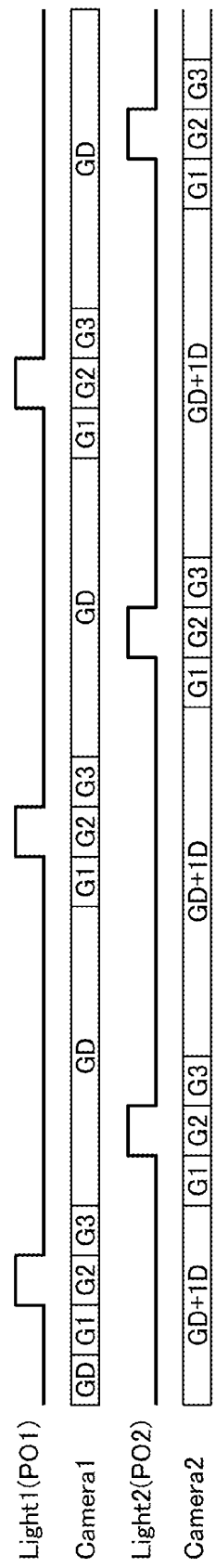
FIG. 10B is a timing diagram showing timings at which a pixel 321 is driven in the distance image capturing device 1A according to the second embodiment of the present invention.

As shown in FIG. 10B, in three accumulation periods following FIG. 10A, a light pulse of the distance image capturing device Camera1 is emitted at a timing at which the drain gate transistor GD of the distance image capturing device Camera2 comes into the turn-on state and thus does not become interference light.

Figure 10C:
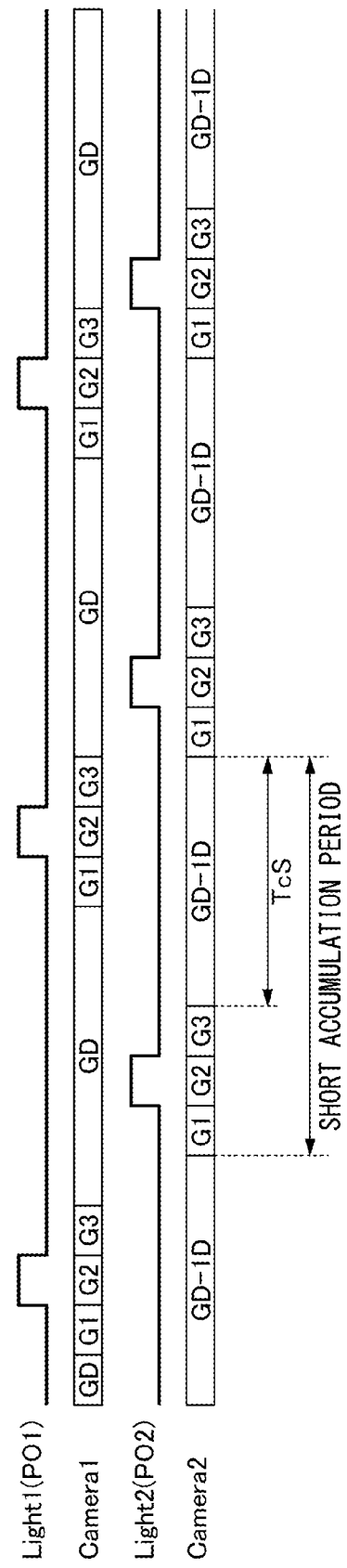
FIG. 10C is a timing diagram showing timings at which a pixel 321 is driven in the distance image capturing device 1A according to the second embodiment of the present invention.

As shown in FIG. 10C, after the long accumulation period is repeated a predetermined number of times, the accumulation period changing unit 45 of the distance image capturing device Camera2 performs accumulation with an accumulation period (short accumulation period) having a time interval shorter than the basic accumulation period by the accumulation time interval Ta. An ND time interval in the short accumulation period has a length of a short ND time interval TcS. Since the accumulation period of the distance image capturing device Camera2 becomes a time interval shorter than the accumulation period of the distance image capturing device Camera1 by the accumulation time interval Ta, timings of emitted light pulses deviate from each other in a direction opposite to that until now. In this example, in three accumulation periods following FIG. 10B, a light pulse of the distance image capturing device Camera1 is emitted at a timing at which the drain gate transistor GD of the distance image capturing device Camera2 comes into the turn-on state and thus does not become interference light.

Figure 10D:
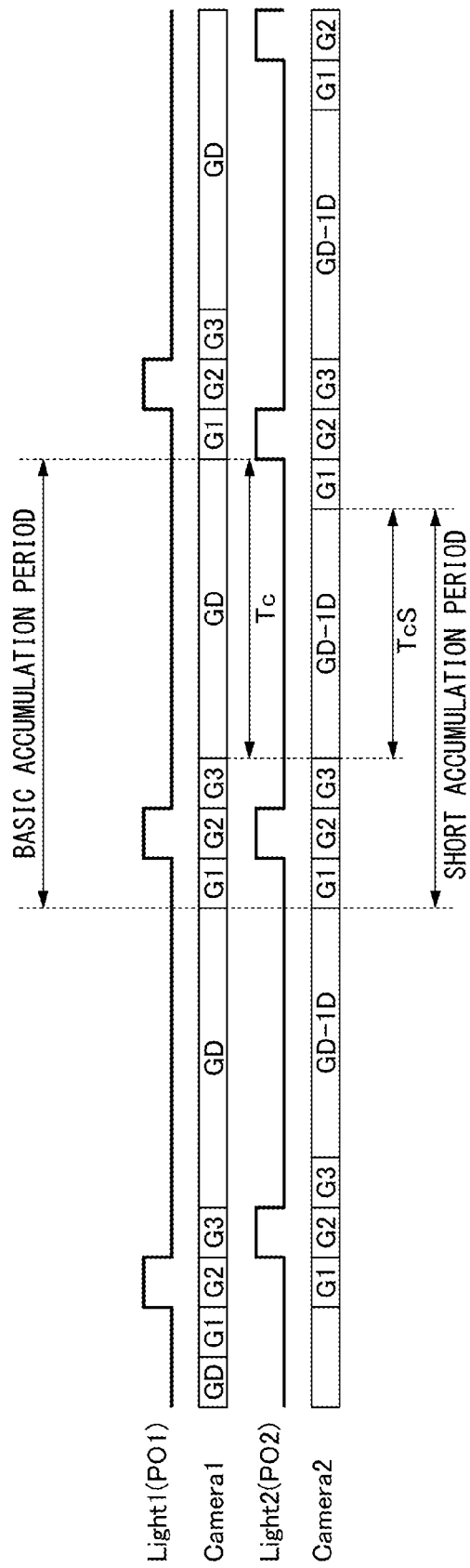
FIG. 10D is a timing diagram showing timings at which a pixel 321 is driven in the distance image capturing device 1A according to the second embodiment of the present invention.

As shown in FIG. 10D, a light pulse emitted by the distance image capturing device Camera1 becomes interference light at a timing at which each of a reading gate transistor G1 of the distance image capturing device Camera2 in the first accumulation period, a reading gate transistor G2 of the distance image capturing device Camera2 in the second accumulation period, and a reading gate transistor G3 of the distance image capturing device Camera2 in the third accumulation period comes into the turn-on state in three accumulation periods following FIG. 10C.

In this way, the accumulation period changing unit 45, for example, sets a first half of the measurement time interval to a long accumulation period, sets a second half to a short accumulation period, and changes lengths of individual accumulation periods in a range in which there is no change in a total length of the accumulation periods in the measurement time interval. In this way, even in a case in which interference light is present, almost the same number of pieces of interference light can be adjusted to be present in the reading gate transistors G1 to G3, and interference light can be processed with being regarded as an external light component. In addition, since the accumulation period changing unit 45 does not change a total length of accumulation periods in the measurement time interval before and after change of the accumulation period, the length of the measurement time interval can be configured to be constant, and regular measurement can be performed.

In addition, in the description presented above, although a case in which a long ND time interval TcL is used in the first half of the accumulation period of the measurement time interval (FIGS. 10A and 10B), and a short ND time interval TcS is used in the second half of the accumulation period (FIGS. 10C and 10D) has been described, the application is not limited thereto. The accumulation period changing unit 45 may perform adjustment such that the reading gate transistors G1 to G3 equally receive interference light, and the long ND time interval TcL and the short ND time interval TcS may be alternately used for every switching unit using a predetermined plurality of accumulation periods as the switching unit.

As described above, in the second embodiment, the length of accumulation periods is changed such that there is no change in the length of a total time interval acquired by multiplying an accumulation period by the number of division instances of a measurement time interval before and after the change of the length of the accumulation period using the accumulation period changing unit. In this way, the distance image capturing device 1A according to the second embodiment can perform adjustment such that the reading gate transistors G1 to G3 equally receive interference light, and erroneous measurement according to interference light can be inhibited by regarding the interference light as an external light component and processing the interference light. In addition, since the length of the total time interval is not changed, there is no change in the measurement period. For this reason, a process using the measurement result can be easily performed, and the usability is improved.

Third Embodiment

Next, a third embodiment will be described. In this embodiment, an external control device 10 integrating a plurality of distance image capturing devices 1B and a plurality of distance image capturing devices 1B is provided, which is different form the embodiment described above. Hereinafter, only components different from those of the embodiments described above will be described, and the description of components equivalent to those of the embodiments described above will be omitted.

Figure 11:
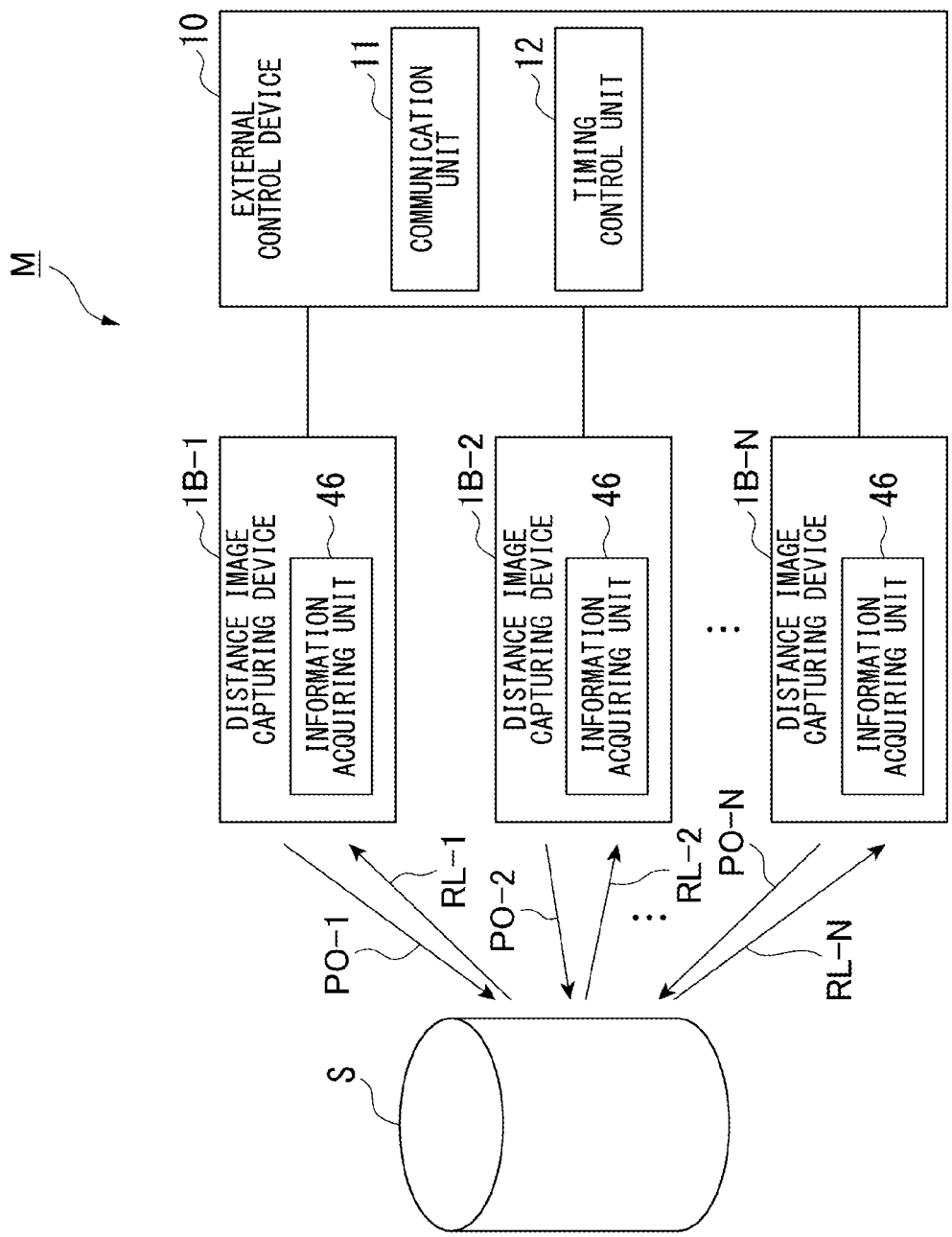
FIG. 11 is a block diagram showing an example of the configuration of a distance image capturing system M to which distance image capturing devices 1B according to a third embodiment of the present invention are applied.

FIG. 11 is a block diagram showing an example of the configuration of a distance image capturing system M to which distance image capturing devices 1B according to the third embodiment of the present invention are applied. The distance image capturing system M includes a plurality of distance image capturing devices 1B (distance image capturing devices 1B-1, 1B-2, . . . , 1B-N) and an external control device 10. Here, N is an arbitrary natural number. The distance image capturing devices 1B and the external control device 10, for example, are communicatively connected using universal serial bus (USB) cables or the like. Here, the distance image capturing device 1B-1 is one example of a "first distance image capturing device". The distance image capturing device 1B-2 is one example of a "second distance image capturing device".

The distance image capturing device 1B includes an information acquiring unit 46. The information acquiring unit 46 acquires various kinds of information from the external control device 10.

The external control device 10, for example, includes a communication unit 11 and a timing control unit 12. The communication unit 11 communicates with the information acquiring unit 46 of the distance image capturing device 1B.

The timing control unit 12 controls a light reception timing of each distance image capturing device 1B. Here, the light reception timing is a timing at which each electric charge accumulating unit CS accumulates electric charge and is a timing at which a reading gate transistor G comes into the turn-on state, in other words, a drive signal TX becomes a "High" level. The light reception timing is one example of an "accumulation timing".

The timing control unit 12 performs control such that a light reception timing of the distance image capturing device 1B-1 and a light reception timing of the distance image capturing device 1B-2 do not overlap each other with respect to time.

Figure 12:
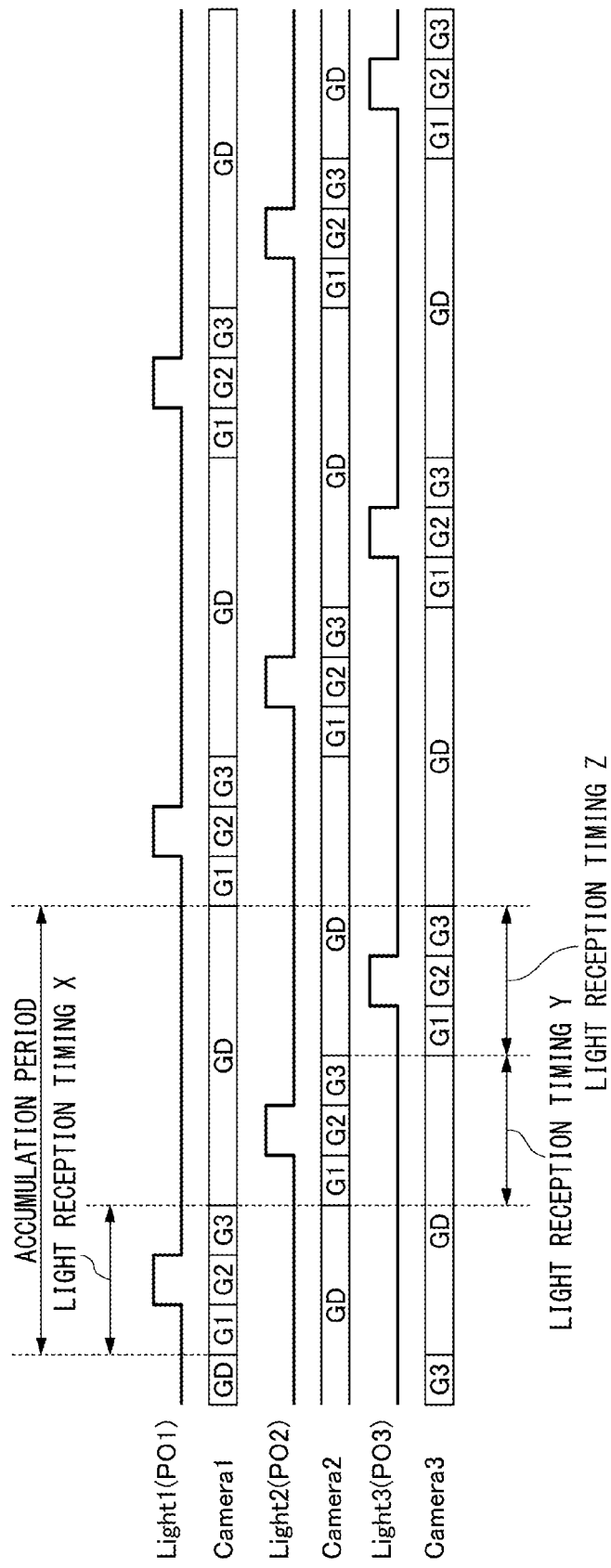
FIG. 12 is a timing diagram showing timings at which a pixel 321 is driven in the distance image capturing device 1B according to the third embodiment of the present invention.

FIGS. 12 and 13 are timing diagrams showing timings at which a pixel 321 is driven in the distance image capturing device 1B according to the third embodiment of the present invention.

FIG. 12 shows light reception timings and timings of emission of light pulses of the distance image capturing device 1B-1 (Camera1), the distance image capturing device 1B-2 (Camera2), and the distance image capturing device 1B-3 (Camera3).

As shown in FIG. 12, for example, the timing control unit 12 performs control such that a light reception timing Y of the distance image capturing device 1B-2 and a light reception timing Z of the distance image capturing device 1B-3 are present in a time interval other than a light reception timing X in the accumulation period of the distance image capturing device Camera1, in other words, a discharge time interval denoted by "GD" (a time interval in which the drain gate transistor GD comes into the turn-on state).

FIG. 13 schematically shows accumulation time intervals of the distance image capturing device 1B-1 (Camera1), the distance image capturing device 1B-2 (Camera2), . . . , the distance image capturing device 1B-6 (Camera6) and timings of emission of light pulses. In FIG. 13, accumulation time intervals "G1/G2/G3/GD/READ" in a measurement time interval and reading time intervals and discharge time intervals not accompanying measurement "GD" are shown. In addition, in FIG. 13, it is shown that emission of light pulses in an accumulation time interval is intermittently performed.

As shown in FIG. 13, the timing control unit 12 may perform control such that a measurement time interval T1 of the distance image capturing device 1B-1, a measurement time interval T2 of the distance image capturing device 1B-2, . . . , a measurement time interval T6 of the distance image capturing device 1B-6 do not overlap each other with respect to time. In this example, the timing control unit 12 performs control such that measurement time intervals sequentially come in order of the distance image capturing device 1B-1, the distance image capturing device 1B-2, . . . , the distance image capturing device 1B-6.

As described above, in the third embodiment, the timing control unit 12 of the external control device 10 controls light reception timings of a plurality of distance image capturing devices 1B. Accordingly, emission of light pulses can be controlled not to become interference light, and, even in a case in which a plurality of distance image capturing devices 1B are adjacently disposed, erroneous measurement according to interference light can be inhibited.

INDUSTRIAL APPLICABILITY

According to each embodiment described above, erroneous measurement of a distance according to incident of interference light can be inhibited without degrading convenience.

REFERENCE SIGNS LIST 1 distance image capturing device
2 light source unit
21 light source device
22 diffusion plate
3 light receiving unit
31 lens
32 distance image sensor
320 light reception area
321 pixel
322 control circuit
323 vertical scanning circuit
324 horizontal scanning circuit
325 pixel signal processing circuit
4 distance image processing unit
41 timing control unit
42 distance calculating unit
43 timing determining unit
44 timing information table
PD photoelectric conversion device
GD drain gate transistor
RU pixel signal reading unit
O output terminal
G reading gate transistor
FD floating diffusion
C electric charge accumulating capacitor
RT reset gate transistor
SF source follower gate transistor
SL selection gate transistor
CS electric charge accumulating unit
PO light pulse

What is claimed is:

1. A method for distance image capturing, the method comprising:
  emitting an intermittent light pulse into a space that is an imaging target at a predetermined period;
  generating an electric charge corresponding to incident light and accumulating the electric charge and dividing and accumulating the electric charge at a predetermined accumulation timing in a two-dimensional matrix pattern;
  acquiring a distance from a subject present in the space that is an imaging target on the basis of an electric charge amount accumulated in a measurement time interval in which the light pulse is emitted in synchronization with the accumulation timing; and
  determining the accumulation timing in the measurement time interval on the basis of an electric charge amount in an inspection time interval in which the light pulse is not emitted at the accumulation timing; and such that an accumulation time interval in which the electric charge is accumulated in which the electric charge amount accumulated in the inspection time interval is a maximum in the inspection time interval and the accumulation time interval at the accumulation timing in the measurement time interval do not overlap each other in an accumulation period that is a period in which the accumulation time interval is repeated.

2. The method according to claim 1, further including determining the accumulation timing in the measurement time interval on the basis in which the electric charge amount accumulated in the inspection time interval is a maximum and information relating to the accumulation timing in the measurement time interval are associated with each other.

3. The method according to claim 1, wherein a length of the inspection time interval is shorter than a length of the measurement time interval.

4. A method for distance image capturing, the method comprising:
  a emitting a light pulse into a space that is an imaging target at a predetermined period;
  generating electric charge corresponding to incident light and accumulating the electric charge and dividing and accumulating the electric charge in synchronization of emission of the light pulse in a two-dimensional matrix pattern;
  acquiring a distance from a subject present in the space that is an imaging target on the basis of an electric charge amount accumulated in a measurement time interval in which accumulation of the electric charge is executed a predetermined number of electric charge division instances; and
  changing a length of the accumulation period such that there is no change in the length of the measurement time interval before and after change of the length of the accumulation period that is a period in which the electric charge is accumulated.

5. A method for distance image capturing, the method comprising:
  emitting a light pulse into a space that is an imaging target at a predetermined period;
  generating electric charge corresponding to incident light and accumulating the electric charge and dividing and accumulating the electric charge in synchronization of emission of the light pulse in a two-dimensional matrix pattern;
  acquiring a distance from a subject present in the space that is an imaging target on the basis of an electric charge amount accumulated in a measurement time interval in which accumulation of the electric charge is executed a predetermined number of electric charge division instances; and
  acquiring timing information to control an accumulation timing at which the electric charge capturing and the accumulation timing do not overlap each other with respect to time.

6. The method for distance image capturing according to claim 5, further including controlling the accumulation timing such that the accumulation timing of the distance image capturing comes in a time interval other than the accumulation timing of the distance image capturing.

7. The method for distance image capturing according to claim 5, further including controlling the accumulation timing such that the measurement time interval of the distance image capturing starts after the measurement time interval of the distance image capturing ends.

8. A distance image capturing method comprising:
- a process of emitting an intermittent light pulse into a space that is an imaging target at a predetermined period;
- a light receiving process of receiving light in which a plurality of pixels each generating electric charge corresponding to incident light and accumulating the electric charge and dividing and accumulating the electric charge at a predetermined accumulation timing are arranged in a two-dimensional matrix pattern;
- a distance image processing process of acquiring a distance from a subject present in the space that is an imaging target on the basis of an electric charge amount accumulated in a measurement time interval in which the light pulse is emitted in synchronization with the accumulation timing; and
- a timing determining process of determining the accumulation timing in the measurement time interval on the basis of an electric charge amount in an inspection time interval in which the light pulse is not emitted at the accumulation timing.

* * * * *